(12) United States Patent
Bank

(10) Patent No.: US 9,056,639 B2
(45) Date of Patent: Jun. 16, 2015

(54) FOLDING VEHICULAR UTILITY TRAILER

(71) Applicant: Roger C. Bank, Fort Collins, CO (US)

(72) Inventor: Roger C. Bank, Fort Collins, CO (US)

(73) Assignee: Roger Charles Bank, Ft. Collins, CO (US)

( * ) Notice: Subject to any disclaimer, the term of this patent is extended or adjusted under 35 U.S.C. 154(b) by 0 days.

(21) Appl. No.: 13/999,946

(22) Filed: Apr. 7, 2014

(65) Prior Publication Data

US 2014/0312593 A1    Oct. 23, 2014

Related U.S. Application Data

(60) Provisional application No. 61/809,311, filed on Apr. 6, 2013.

(51) Int. Cl.
  *B62D 1/00*    (2006.01)
  *B62D 63/06*   (2006.01)

(52) U.S. Cl.
  CPC .................................. *B62D 63/061* (2013.01)

(58) Field of Classification Search
  USPC ................. 280/656, 30, 79.11, 492, 638, 639
  See application file for complete search history.

(56) References Cited

U.S. PATENT DOCUMENTS

| 4,175,768 | A  | * | 11/1979 | Thackray ........................ 280/652 |
| 4,239,258 | A  | * | 12/1980 | Burris ............................ 280/639 |
| 4,480,851 | A  | * | 11/1984 | St-Pierre ........................ 280/656 |
| 4,511,181 | A  | * | 4/1985  | Schantz ............................ 298/5 |
| 4,582,333 | A  | * | 4/1986  | Doering ........................... 280/63 |
| 5,249,821 | A  | * | 10/1993 | Ricketts et al. ................ 280/638 |
| 6,378,893 | B1 | * | 4/2002  | Jager ............................. 280/656 |
| 6,557,882 | B2 | * | 5/2003  | Harrington ................ 280/415.1 |
| 6,659,497 | B1 | * | 12/2003 | Owens .......................... 280/656 |
| 7,000,933 | B2 | * | 2/2006  | Arling et al. .................. 280/204 |
| 7,178,823 | B1 | * | 2/2007  | Tai ................................ 280/656 |
| 7,780,185 | B2 | * | 8/2010  | McConkey et al. ........... 280/656 |
| 8,191,921 | B2 | * | 6/2012  | Hyde ............................ 280/656 |
| 8,613,462 | B2 | * | 12/2013 | Bernard ..................... 280/415.1 |
| 8,684,412 | B2 | * | 4/2014  | Steins .......................... 280/789 |
| 2004/0100045 | A1 | * | 5/2004  | Amacker ......................... 280/30 |
| 2005/0093273 | A1 | * | 5/2005  | McDonell ..................... 280/656 |
| 2006/0038384 | A1 | * | 2/2006  | Cumbie ........................ 280/656 |
| 2007/0132209 | A1 | * | 6/2007  | Winter et al. ................. 280/656 |
| 2010/0176574 | A1 | * | 7/2010  | Pollice ......................... 280/401 |
| 2011/0221168 | A1 | * | 9/2011  | Alexander .................... 280/639 |
| 2011/0260430 | A1 | * | 10/2011 | Markovich .................... 280/656 |
| 2014/0265248 | A1 | * | 9/2014  | Ravencroft et al. ........ 280/491.1 |

* cited by examiner

*Primary Examiner* — Jeffrey J Restifo
*Assistant Examiner* — Erez Gurari

(57) ABSTRACT

Disclosed are systems and methods for a folding vehicle trailer. The trailer design is able to be made of various lengths and widths from as well as multiple axle configurations. This trifold design is compact and allows for vertical stacking of sectionalized components to minimize space, while maintaining great flexibility and simplicity for the end user.

18 Claims, 32 Drawing Sheets

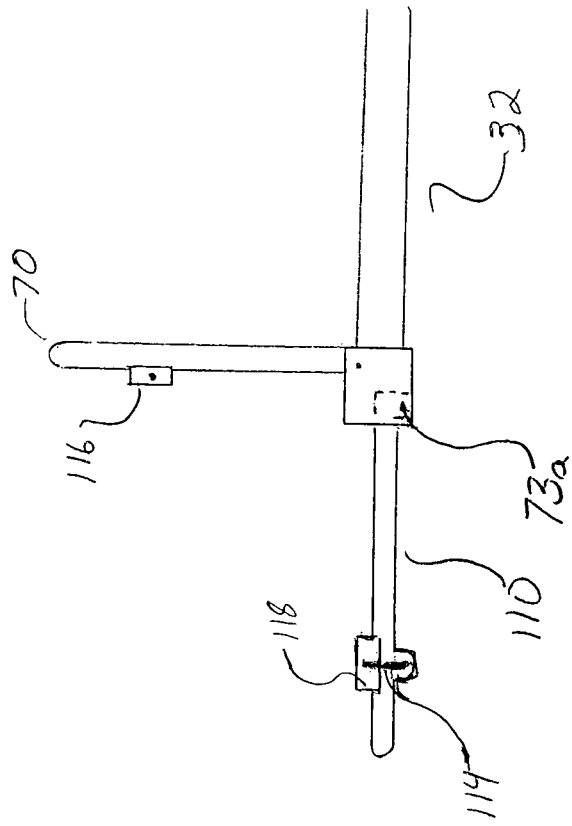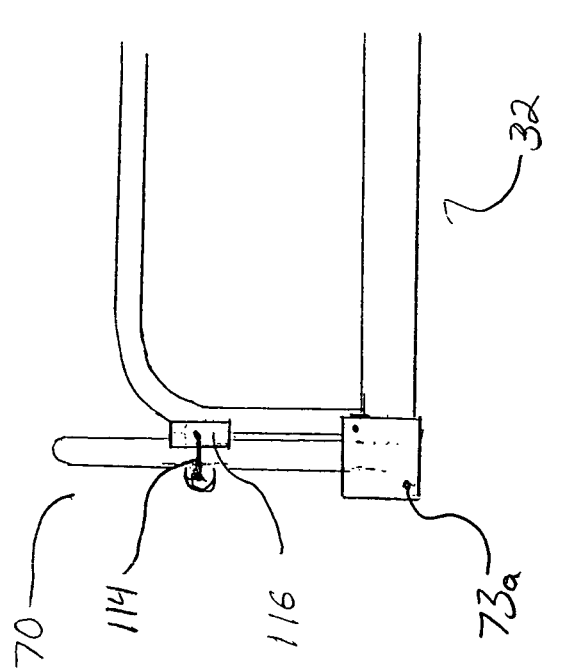
FIG. 6

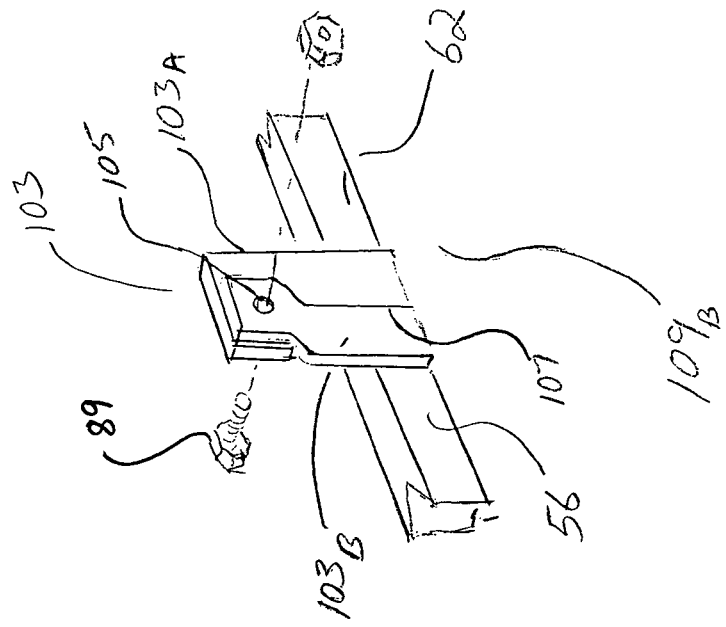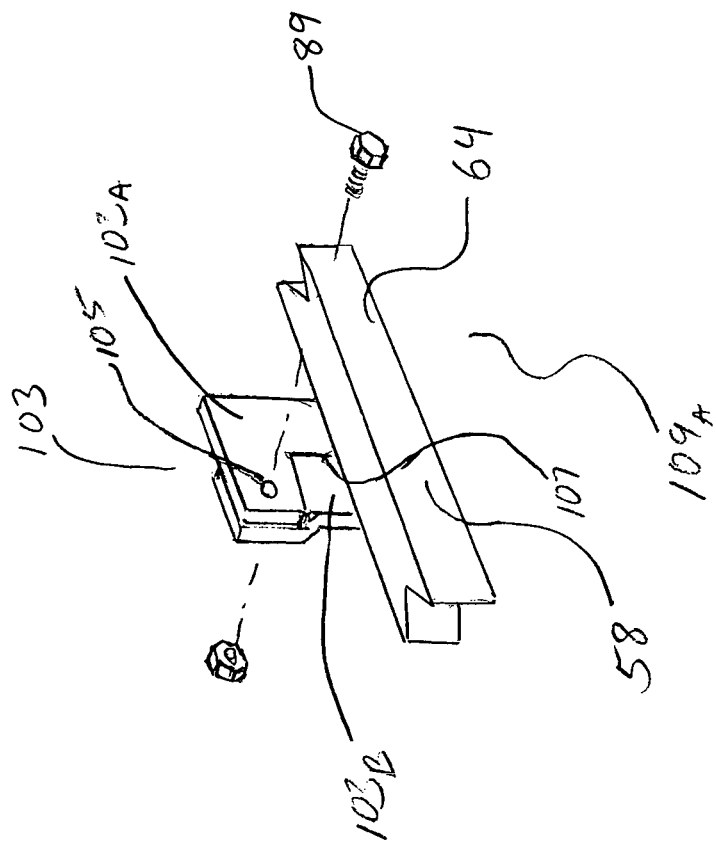
FIG 14

FOLDING VEHICULAR UTILITY TRAILER

BACKGROUND OF THE INVENTION

Trailers have been used for centuries, from hand or horse drawn trailers of prehistory, to the vehicular trailers of today. A common similarity that has been possessed by all of these devices is their need to be stored. If space is limited, having a trailer is often not an option. While various attempts have been made to overcome the size demands of a towable vehicular trailer, these efforts have fallen short for a variety of reasons due to their design. These shortcomings are usually realized with a high center of gravity, coupled with a narrow stance and compaction, while in the stored position which often translates to issues of safety. In most prior attempts, additional mechanisms such as cables, clasping mechanisms or removable pins are necessary to facilitate their operation.

SUMMARY OF THE INVENTION

An embodiment of the present invention may therefore comprise: a utility trailer configured to be towed behind a vehicle that facilitates alteration between an open configuration and a compact configuration comprising: a center trailer section comprising: a rigid rectangular center frame chassis; a center bed floor disposed on the front frame; a wheeled axle and suspension system supporting the center frame; and, a pair of collapsible center side barriers pivotally attached to opposing lateral sides of the center frame such that the center side barriers may maintain a normal orientation to the center bed floor in an open configuration, and fold approximately parallel to, and stacked upon, the center bed floor in a compact configuration; a front trailer section comprising: a rigid rectangular front frame chassis; a front bed floor disposed on the front frame; a pair of collapsible front side barriers pivotally attached to opposing lateral sides of the front frame such that the center side barriers may maintain a normal orientation to the front bed floor in an open configuration, and fold approximately parallel to, and stacked upon, the front bed floor in a compact configuration; and, a collapsible front end barrier pivotally attached to the front portion of the front frame such that the front end barrier may maintain a normal orientation or a parallel orientation extending forward of the front bed floor in an open configuration, and fold approximately parallel to, and stacked upon, the front side barriers in a compact configuration; a rear trailer section comprising: a rigid rectangular rear frame chassis; a rear bed floor disposed on the rear frame; a pair of collapsible rear side barriers pivotally attached to opposing lateral sides of the rear frame such that the rear side barriers may maintain a normal orientation to the rear bed floor in an open configuration, and fold approximately parallel to, and stacked upon, the rear bed floor in a compact configuration; and, a collapsible rear end barrier pivotally attached to the rear portion of the rear frame such that the rear end barrier may maintain a normal orientation or a parallel orientation extending rearward of the rear bed floor in an open configuration, and fold approximately parallel to, and stacked upon, the rear side barriers in a compact configuration; a tongue that facilitates connection between the center trailer section and the vehicle; a rearward offset hinge mechanism comprising two offset braces joined by a rear pivot, that pivotally joins the center trailer section and the rear trailer section such that the pivot point of the junction is offset above the center bed floor by a distance of half the combined thickness of the collapsed center side barrier, the collapsed rear side barrier, the rear end barrier, combined with the rear pivot diameter, thereby allowing the rear trailer section to stack directly upon the collapsed center trailer section thereby minimizing the overall stack height of the center and the rear trailer sections; and, a forward offset hinge mechanism comprising two forward offset braces joined by a forward pivot, that pivotally joins the center trailer section and the front trailer section such that the pivot point of the junction is offset above the center bed floor by a distance of half the combined thickness of the collapsed center side barrier, the collapsed rear side barrier, the rear end barrier and the rear trailer section, combined with the forward pivot diameter, thereby allowing the front trailer section to stack directly upon the collapsed rear trailer section when it is stacked directly upon the center trailer section thereby minimizing the overall stack height of the center, the rear and the front trailer sections.

An embodiment of the present invention may also comprise: a utility trailer configured to be towed behind a vehicle that facilitates alteration between an open configuration, a compact configuration and a stored configuration comprising: a center trailer section comprising: a rigid rectangular center frame chassis; a center bed floor disposed on the front frame; a wheeled axle and suspension system supporting the center frame; and, a pair of collapsible center side barriers pivotally attached to opposing lateral sides of the center frame such that the center side barriers may maintain a normal orientation to the center bed floor in an open configuration, and fold approximately parallel to, and stacked upon, the center bed floor in a compact configuration or stored configuration; a front trailer section comprising: a rigid rectangular front frame chassis; a front bed floor disposed on the front frame; a pair of collapsible front side barriers pivotally attached to opposing lateral sides of the front frame such that the center side barriers may maintain a normal orientation to the front bed floor in an open configuration, and fold approximately parallel to, and stacked upon, the front bed floor in a compact configuration or stored configuration; and, a collapsible front end barrier pivotally attached to the front portion of the front frame such that the front end barrier may maintain a normal orientation or a parallel orientation extending forward of the front bed floor in an open configuration, and fold approximately parallel to, and stacked upon, the front side barriers in a compact configuration or stored configuration; a rear trailer section comprising: a rigid rectangular rear frame chassis; a rear bed floor disposed on the rear frame; a pair of collapsible rear side barriers pivotally attached to opposing lateral sides of the rear frame such that the rear side barriers may maintain a normal orientation to the rear bed floor in an open configuration, and fold approximately parallel to, and stacked upon, the rear bed floor in a compact configuration or stored configuration; and, a collapsible rear end barrier pivotally attached to the rear portion of the rear frame such that the rear end barrier may maintain a normal orientation or a parallel orientation extending rearward of the rear bed floor in an open configuration, and fold approximately parallel to, and stacked upon, the rear side barriers in a compact configuration or stored configuration; a tongue that facilitates connection between the center trailer section and the vehicle, the tongue that remains fixed upon the centerline of the center trailer section in the open configuration, and the tongue that rotates in the plane of the center trailer bed to a normal position to the centerline of the center trailer section in the stored configuration; a rearward offset hinge mechanism comprising two offset braces joined by a rear pivot, that pivotally joins the center trailer section and the rear trailer section such that the pivot point of the junction is offset above the center bed floor by a distance of half the combined thickness of the collapsed center side barrier, the collapsed rear side barrier, the rear end barrier, combined with the rear pivot diameter, thereby allowing the rear trailer section to stack directly upon the collapsed center trailer section thereby minimizing the overall stack height of the center and the rear trailer sections; a forward offset hinge mechanism comprising two forward offset braces joined by a forward pivot, that pivotally joins the center trailer section and the front trailer section such that the pivot point of the junction is offset above the center bed floor by a distance of half the combined thickness of the collapsed center side barrier, the collapsed rear side barrier, the rear end barrier and the rear trailer section, combined with the forward pivot diameter, thereby allowing the front trailer section to stack directly upon the collapsed rear trailer section when it is stacked directly upon the center trailer section thereby minimizing the overall stack height of the center, the rear and the front trailer sections; at least two lower castors positioned on the underside of the center trailer section oriented in a rearward direction; and, at least two upper castors positioned on the underside of the rear trailer section oriented in a forward direction in the open configuration and oriented in a rearward direction in a compact configuration that allow the trailer to be rotated approximately 90 degrees along a centerline from front to back in a compact configuration, to support the weight of the trailer in with the upper castors and the lower castors by raising the tongue from a horizontal orientation to a vertical orientation.

BRIEF DESCRIPTION OF THE DRAWINGS

In the drawings,

FIG. 6 illustrates the containment sections of an embodiment of a folding vehicular utility trailer.

FIG. 14 illustrates a hinge and retainer mechanism of an embodiment of a folding vehicular utility trailer.

DETAILED DESCRIPTION OF THE INVENTION

Figure 1:
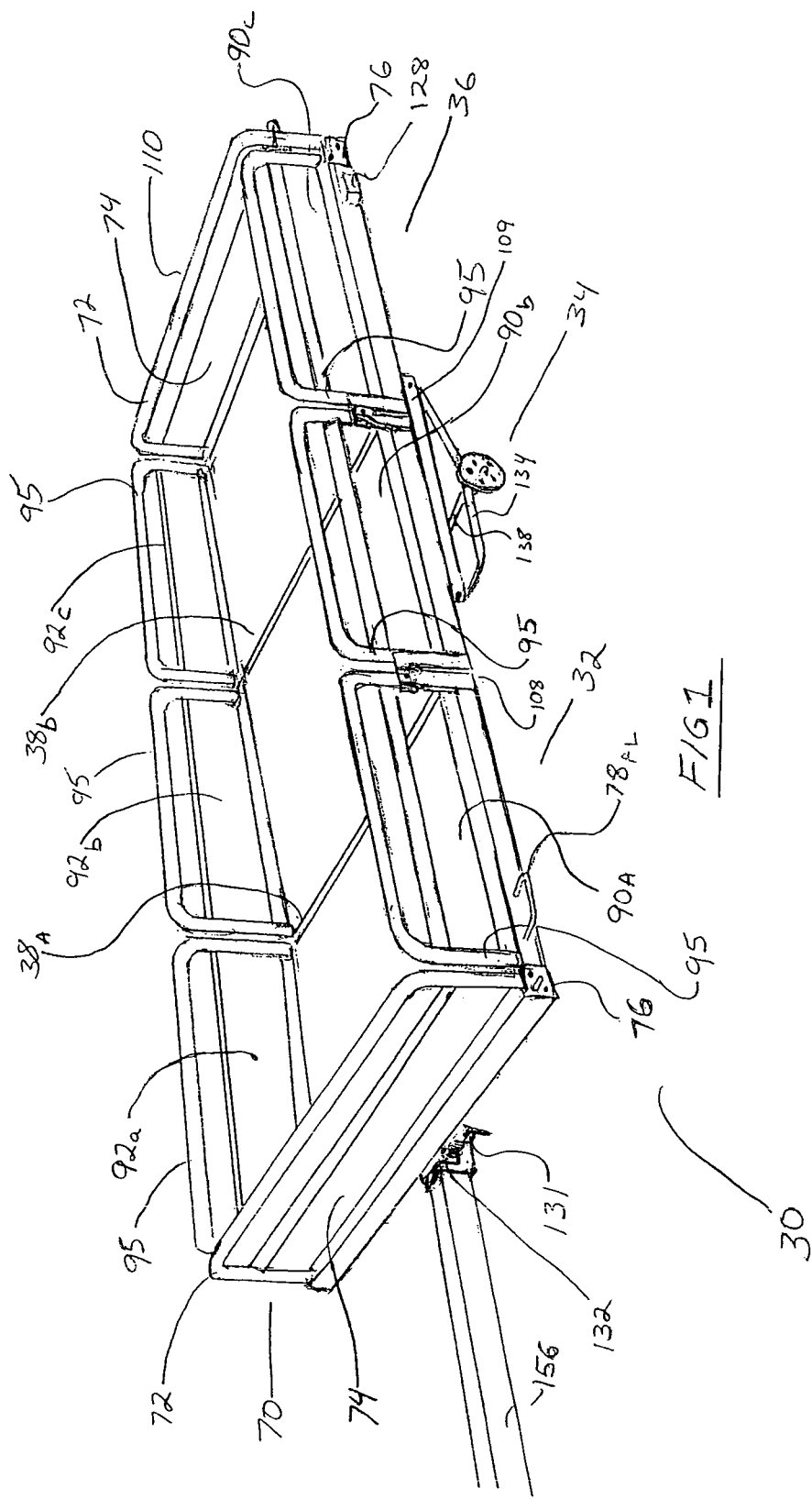
FIG. 1 illustrates an isometric view of an embodiment of a folding vehicular utility trailer.

While this invention is susceptible to embodiment in many different forms, it is shown in the drawings, and will be described herein in detail, specific embodiments thereof with the understanding that the present disclosure is to be considered as an exemplification of the principles of the invention and is not to be limited to the specific embodiments described.

Conventional vehicular trailers mentioned above have many limitations. The disclosed embodiments provide a trailer that is stable and secure in the folded or unfolded orientation providing additional safety in its use and storage. These designs accomplish this without the reliance upon removable pins and additional parts. The disclosed embodiments readily, quickly and easily fold into a highly compact form that facilitates a very low center of gravity and a dense collection of the mass (low volume) and maintains maneuverability while in either state of assembly.

FIG. 1 illustrates an isometric view of an embodiment of a folding vehicular utility trailer. As shown in FIG. 1, the trailer comprises a bed floor, and a frame of several sections and components that when properly configured, combine to make a larger trailer. The trailer bed is made up of three smaller segmented sections, the front trailer section 32, center trailer section 34 (mid-section) and a rear trailer section 36. Left lateral side barriers 90a, 90b, 90c and right lateral side barriers 92a, 92b, 92c and end barriers 70, 110 are mounted to the front and rear trailer sections respectively to provide containment sections for the trailer payload. When end barriers 70, 110 are laid out horizontally and outward from the ends of the trailer they act to provide additional bed length for the trailer and allow the payload to overhang the bed length, thereby providing capacity for long items to be transported.

FIG. 1 illustrates the unfolded operating position of the trailer and all side barriers 90*a*, 90*b*, 90*c*, 92*a*, 92*b*, 92*c* are shown extended and locked for transporting a payload. Each of these barriers is pivotally hinged to fold inward and flat against the bed floor for folding or for a flat-bed trailer option. Similarly, end barriers 70, 110 fold inward, as well as outward, from the center of the trailer to accommodate various positions and functions.

The trailer is divided in to the three aforementioned trailer sections 32, 34 and 36 by two parting lines 38*a*, 38*b*. These trailer sections are pivotally connected (hinged) to each other along the parting lines, as shown with the front and rear trailer sections 32, 36 pivotally connected (hinged) attached to end barriers 70, 110 on the ends of the trailer and make up two additional part lines 38*c*, 38*d*.

The front and rear trailer sections 32, 36 are structurally contained at the forward most and rearward most corners utilizing flat plate hinges 76 that perform multiple functions in the operation of the trailer. First, the flat plate hinges 76 attach the end barriers 70, 110 to the trailer. Second, they allow each end barrier 70, 110 to be folded out from the trailer 30 at a position that is level with the bed floor. Third, they allow the end barrier 70, 110 to be folded backward and up over the top of the front trailer section 32 and rear trailer section 36 respectively, and further allow the side barriers 90*a*, 90*b*, 90*c* and 92*a*, 92*b*, 92*c* to fold underneath. Additionally, the flat plate hinges 76 allow the end barriers 70, 110 to stand alone vertical upright to the horizontal bed floor.

The center trailer section 34 serves as the structural foundation for the trailer to which the additional components attach. The attachments to the center trailer section 34 encompass the trailer tongue 156 and the front and rear trailer sections 32 and 36, with their respective components. The tongue 156 is held into position by a tongue slide 158 (shown and described in detail below). The tongue slide sway tab saddle 132 comprises two tongue slide sway tabs 133*a*, 133*b* on the bottom of the front frame section 42 (chassis) and the front cross member bed 48*a*. The locking tongue spring pin 131 pass through an aperture on the sway tabs 133*a*, 133*b*, the tongue slide 158, and through the tongue 156, which locks the tongue in place for towing. On the back of the tongue 156 is a tongue stop blocker 312 that prevents the tongue 156 from exiting from the tongue slide 158. This prevents disengagement as a safety measure in an instance where the locking tongue spring pin 131 is not engaged. The stop blocker 312 makes contact with blocker 314 in the tongue slide at a predetermined distance (see FIG. 26).

Figure 2:
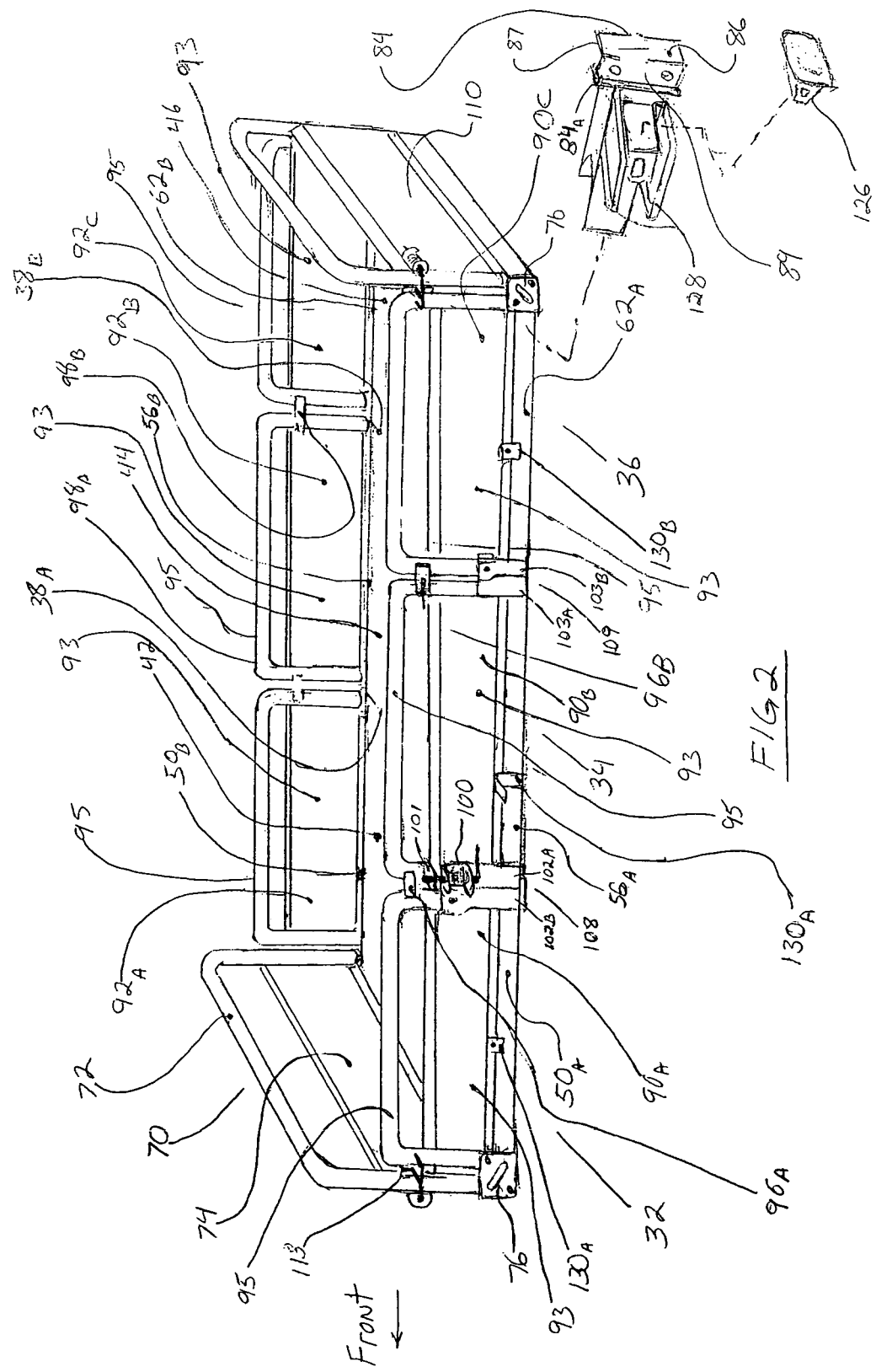
FIG. 2 illustrates another isometric view of an embodiment of a folding vehicular utility trailer.

FIG. 2 further illustrates the embodiment of a folding vehicular utility trailer shown in FIG. 1. As is also illustrated in FIG. 1, left lateral side barriers 90*a*, 90*b*, 90*c* and right lateral side barriers 92*a*, 92*b*, 92*c* are comprised of side barrier tubes 95 and side barrier skin 93 and are all similar and are universally utilized. Each end barrier 70, 110 possess a similar skin and tube design as the side barriers, and are shown as end barrier tubes 72 and end barrier skins 74 respectively, but are longer then the side barrier tube rails 95 and side barrier skins 93 and are also universally utilized on either end of the trailer.

Figure 9:
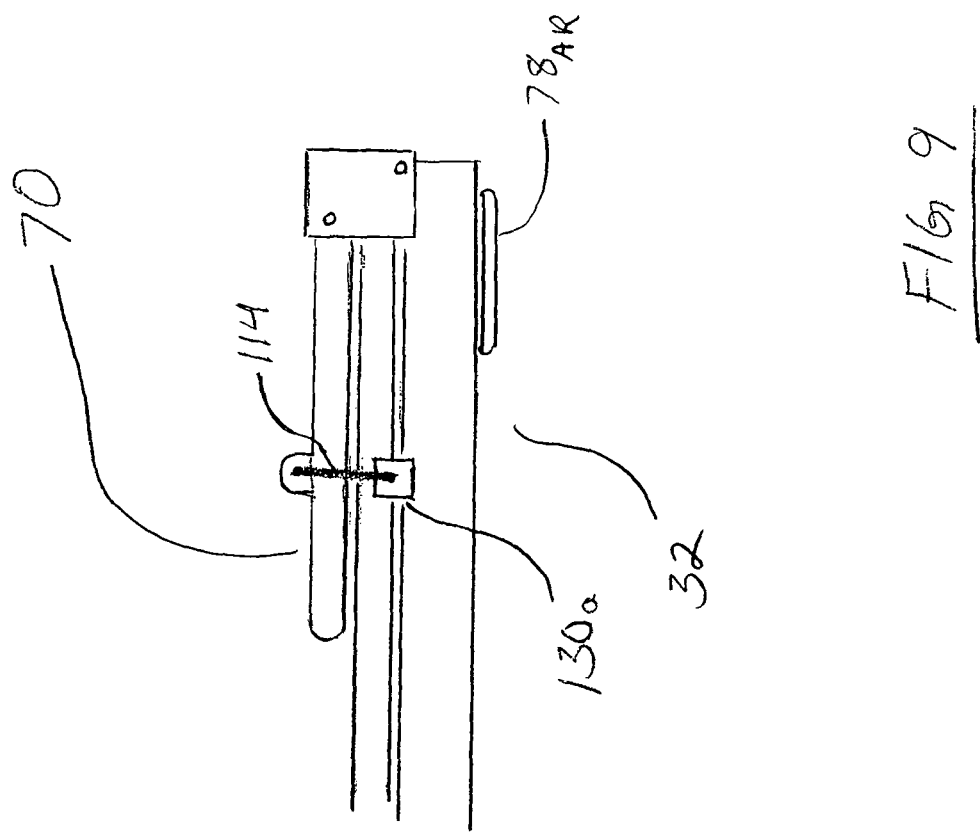
FIG. 9 illustrates the containment sections of an embodiment of a folding vehicular utility trailer.
Figure 24:
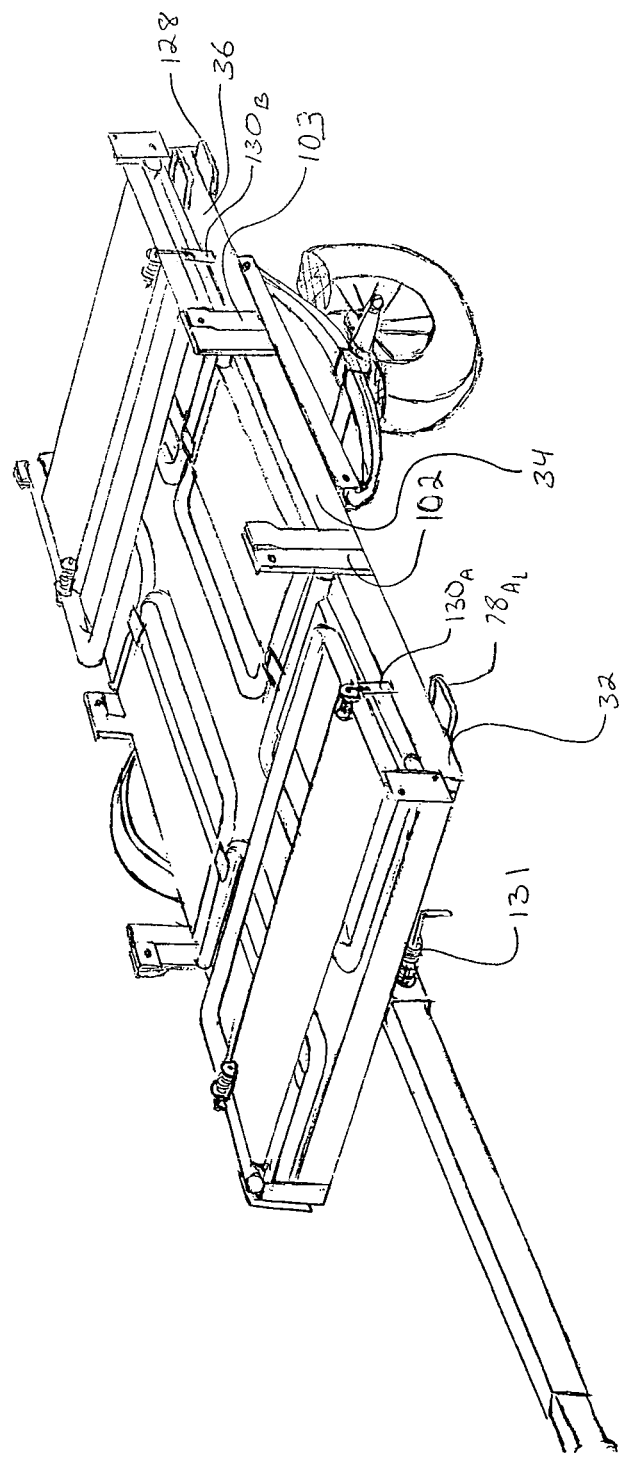
FIG. 24 illustrates an isometric view of an embodiment of a folding vehicular utility trailer with all the containment panels fully folded.

FIG. 2 also shows the front frame section 42 with front end barrier folded lock tab 130*a* attached to the front frame side rail 50*a*, and rear frame section 46 (chassis) with rear end barrier folding lock tabs 130*b* attached to the left rear frame side rail 62*a*. These lock tabs are utilized in conjunction with a single-finger spring pin latch 114 when an end barrier 70, 110 is placed into a folded position (as shown in FIGS. 9 and 24). FIG. 2 additionally shows a tail light 126 that is attached by fastening to the tail light guard and grab handle 128, which is attached to the rear frame section side rails 62*a*, 62*b*.

Figure 7:
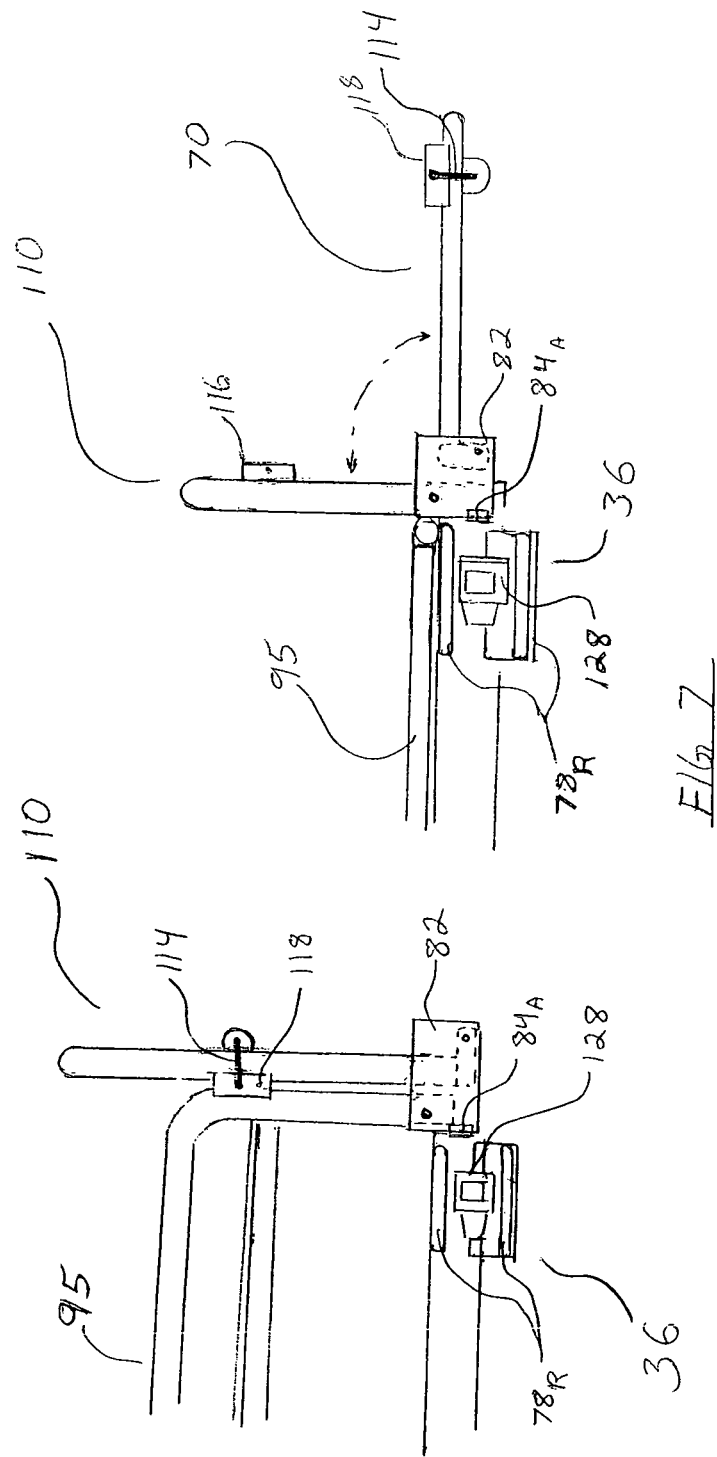
FIG. 7 illustrates the containment sections of an embodiment of a folding vehicular utility trailer.
Figure 8:
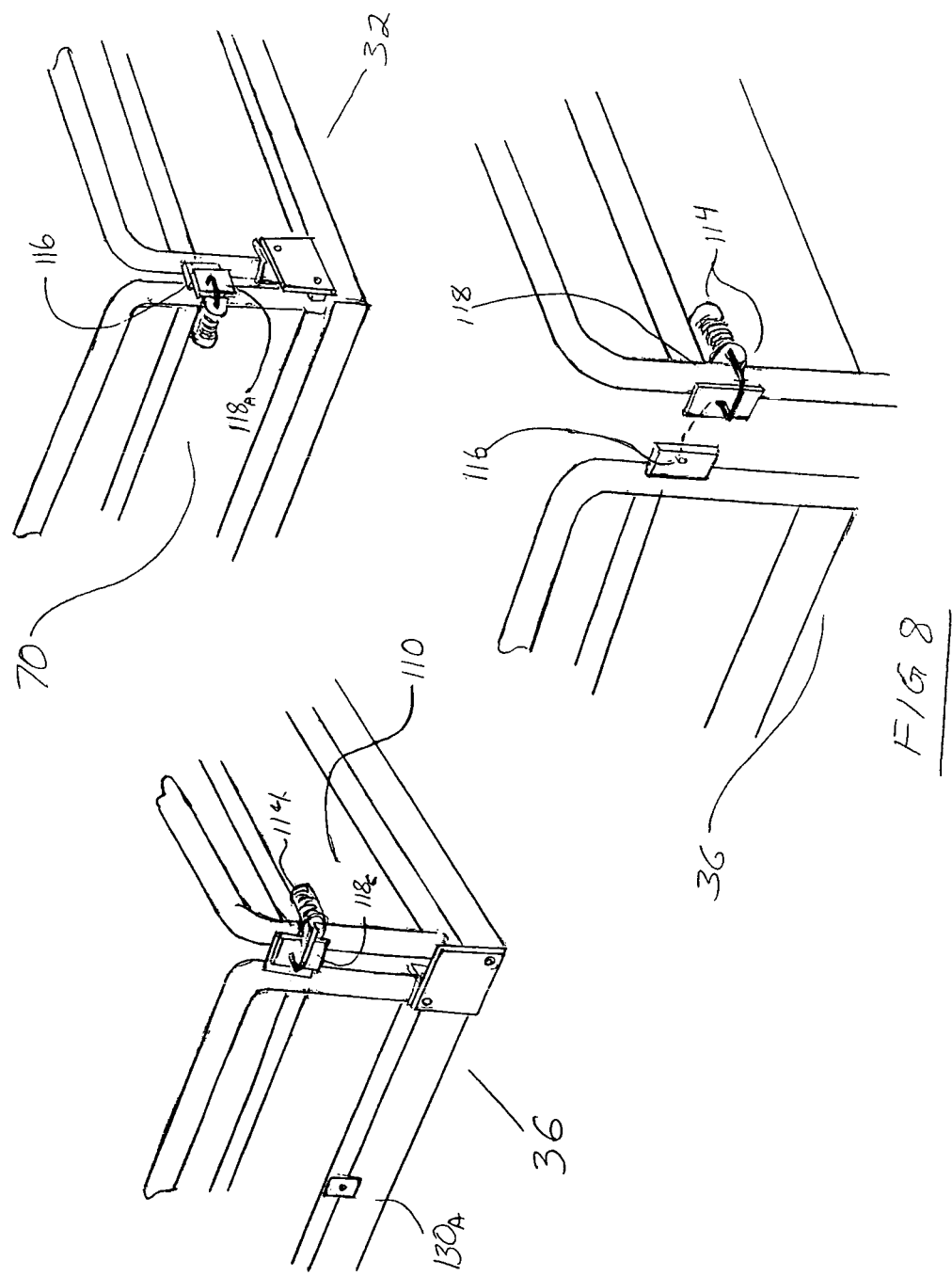
FIG. 8 illustrates the containment sections of an embodiment of a folding vehicular utility trailer.

Also shown in FIGS. 1 and 2, are the rear end barrier 110 and front end barrier 70 which are attached to the two flat plates hinges 76 (further detailed in FIG. 5), which are attached rearward to the rear frame side rails 62*a*, 62*b*, and forward to the front frame side rails 50*a*, 50*b*. The rear end barrier 110 and front end barrier 70 latch in an upright vertical position on both the left and right side utilizing a spring pin latch 114 (also detailed in FIGS. 8 and 9). The right and left side of each end barrier 110, 70, has a single-fingered spring pin latch 114, and a universal finger parking tab 118 (further detailed in FIGS. 6, 7 and 8).

The universal finger parking tabs 118 allow the entire single-finger spring pin latch 114 to rest on the parking tab 118, thereby keeping the spring finger pin latch 114 from being engaged through the aperture in both the universal finger parking tab 118 and universal locking tab 116. The front and rear side barriers 90*a*, 90*c* and 92*a*, 92*c* contain universal locking tabs 116. When the single-finger spring pin in latch 114 is rotated onto the universal finger parking tab 118, the end barrier 70, 110 may then be raised or lowered. When the universal locking tabs 116, in conjunction with the universal finger parking tabs 118 and single spring pin latches 114, engage into the aperture 116, 118, it secures the end barriers to the upright side barrier tubes 95 when end barrier and side barrier are abutted in the upright vertical position as shown in FIG. 2.

Figure 12:
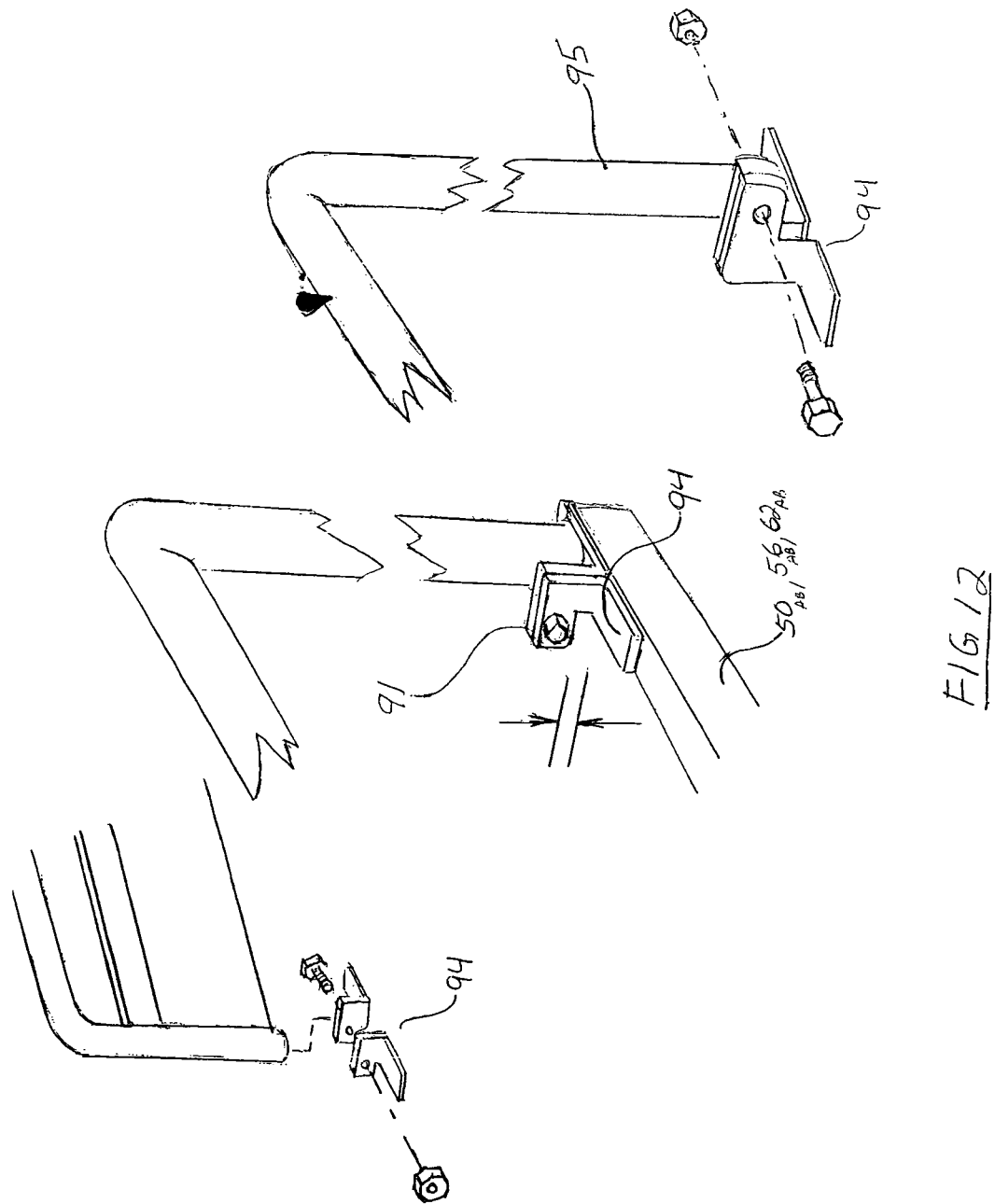
FIG. 12 illustrates a hinge and retainer mechanism of an embodiment of a folding vehicular utility trailer.

FIGS. 1 and 2 further depict the left side barriers 90*a*, 90*b*, 90*c* and right side barriers 92*a*, 92*b*, 92*c*, which are interchangeable and attached with butterfly hinges 94 (detailed in FIG. 12). In this embodiment, one side of the butter fly hinge 94 attaches to the front frame side rails 50*a*, 50*b*, center frame side rails 56*a*, 56*b*, and rear frame side rails 62 and 62*b* rear, while the other side of the butter fly hinge 94 attaches to side barrier tube 95. The butterfly hinge utilized in this embodiment has an offset pivot point 91 that facilitates the engagement when the upper end of left side barriers 90*a*, 90*b*, 90*c* and right side barriers 92*a*, 92*b*, 92*c* 90*a*, 90*b*, 90*c* rotate for storage, and the upper end of side barrier tube 95 abuts when laid down onto the top of the front, center, and rear bed floor 22, 24, 26.

Figure 20:
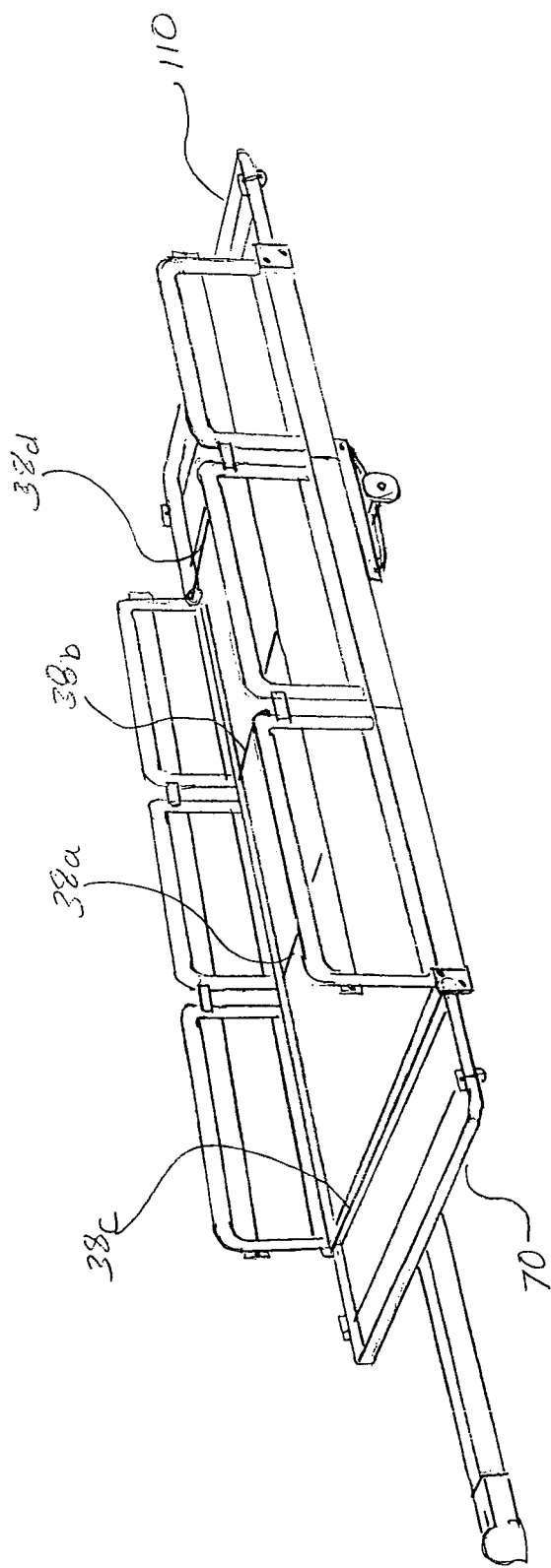
FIG. 20 illustrates an isometric view of an embodiment of a folding vehicular utility trailer configured to maximizing payload length.

The side barrier tubes 95 lower-end rotates up and over the offset pivot point 91 (detailed in FIG. 12) of the butterfly hinge 94, and remains above the bed floor 22, 24, 26. This lower end of side barrier tube 95, remains above the bed floor 22, 24, 26 and facilitates the exterior side barrier tab/strap 96*a*, 96*b*, to engage and align the outward side barriers 92*a*, 92*c* and 90*a*, 90*c* respectively while adjoining all side barriers together for raising and lowering all side barriers simultaneously. Additionally, when side barriers 90*a*, 90*b*, 90*c* and 92*a*, 92*b*, 92*c* are rotated to the vertical standing up position, (detailed in FIG. 20) the offset pivot point 91 rotates the side barrier tube 95 up, over and down onto the frame side rails 50*a*, 50*b*, 56*a*, 56*b*, and 62*a*, 62*b*. When these side barriers are rotated vertically, this unloads the rotation point 91 of the butterfly hinge 94 and puts the side barrier rail into compression on top of frame side rails 50*a*, 50*b*, 56*a*, 56*b* and 62*a*, 62*b* to take the vertical download placed upon the side barriers 90*a*, 90*b*, 90*c* and 92*a*, 92*b*, 92*c*.

Figure 13:
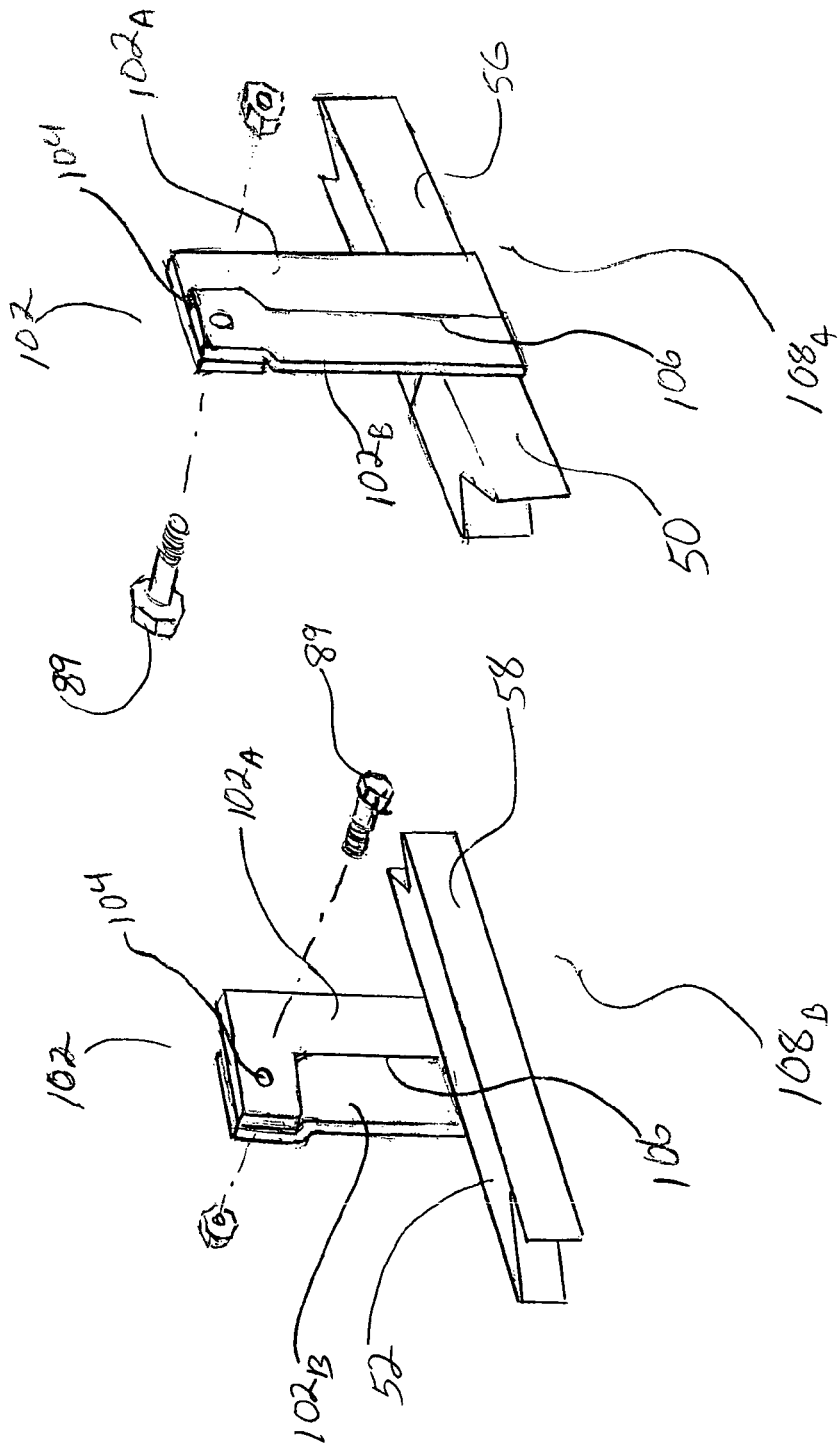
FIG. 13 illustrates a hinge and retainer mechanism of an embodiment of a folding vehicular utility trailer.

As further detailed in FIGS. 13 and 14, side loads placed upon the side barriers 90*a*, 90*b*, 90*c* and 92*a*, 92*b*, 92*c* are carried by the rear and front side barrier hinges 108 and 109 respectively, and vertical support members 84 when locked by a spring latch 100 and a locking tab 101. The locking tab 101 is attached to the front side of the side barrier 90b and 92b of and extends off of side barrier tube 95.

Figure 21:
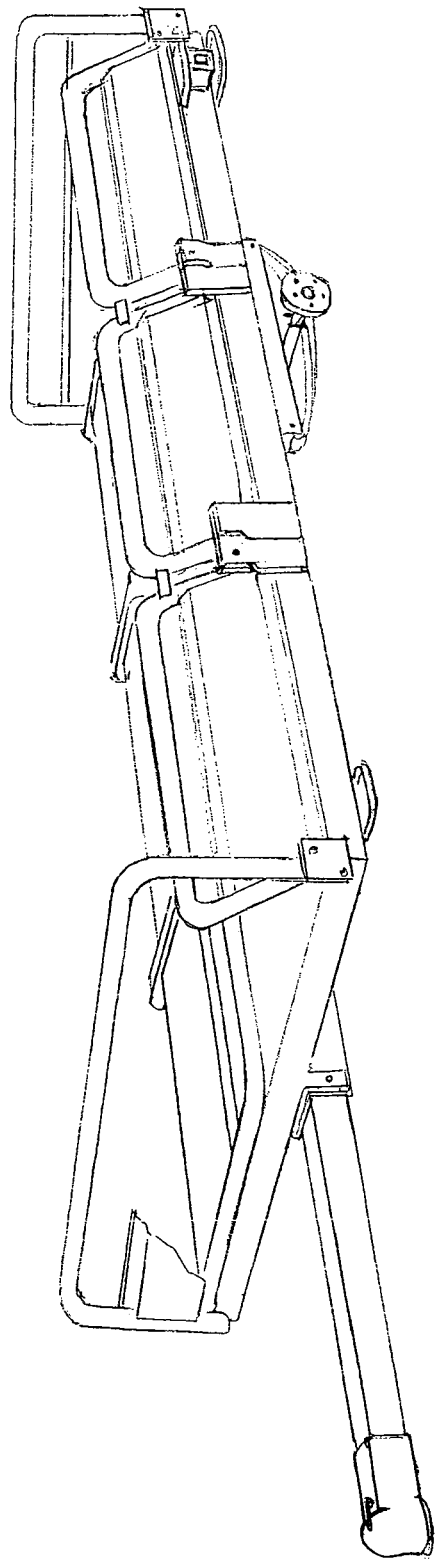
FIG. 21 illustrates an isometric view of an embodiment of a folding vehicular utility trailer with the side containment panels partially folded.

The center side barriers 90b and 92b have exterior adjoining side barrier tabs 96a, 96b and interior adjoining side barrier tabs 98a, 98b. The exterior adjoining side barrier tab on the center side barrier 90b and 92b make contact with the front side barriers 90a, 92a and rear side barriers 90c, 92c, thereby allowing all of the individual side barriers to be lowered into the down position as a single unit onto the bed floor 22, 24, 26. Side barriers 90b and 92b, interior side barrier adjoining tabs 98a, 98b (further detailed in FIG. 4), make simultaneous contact with the front and rear side barriers 90a, 92a, and 90c, 92c respectively, allowing the three side barriers to be raised into the vertical position together as a single unit, as further shown in FIGS. 20 and 21.

Figure 3:
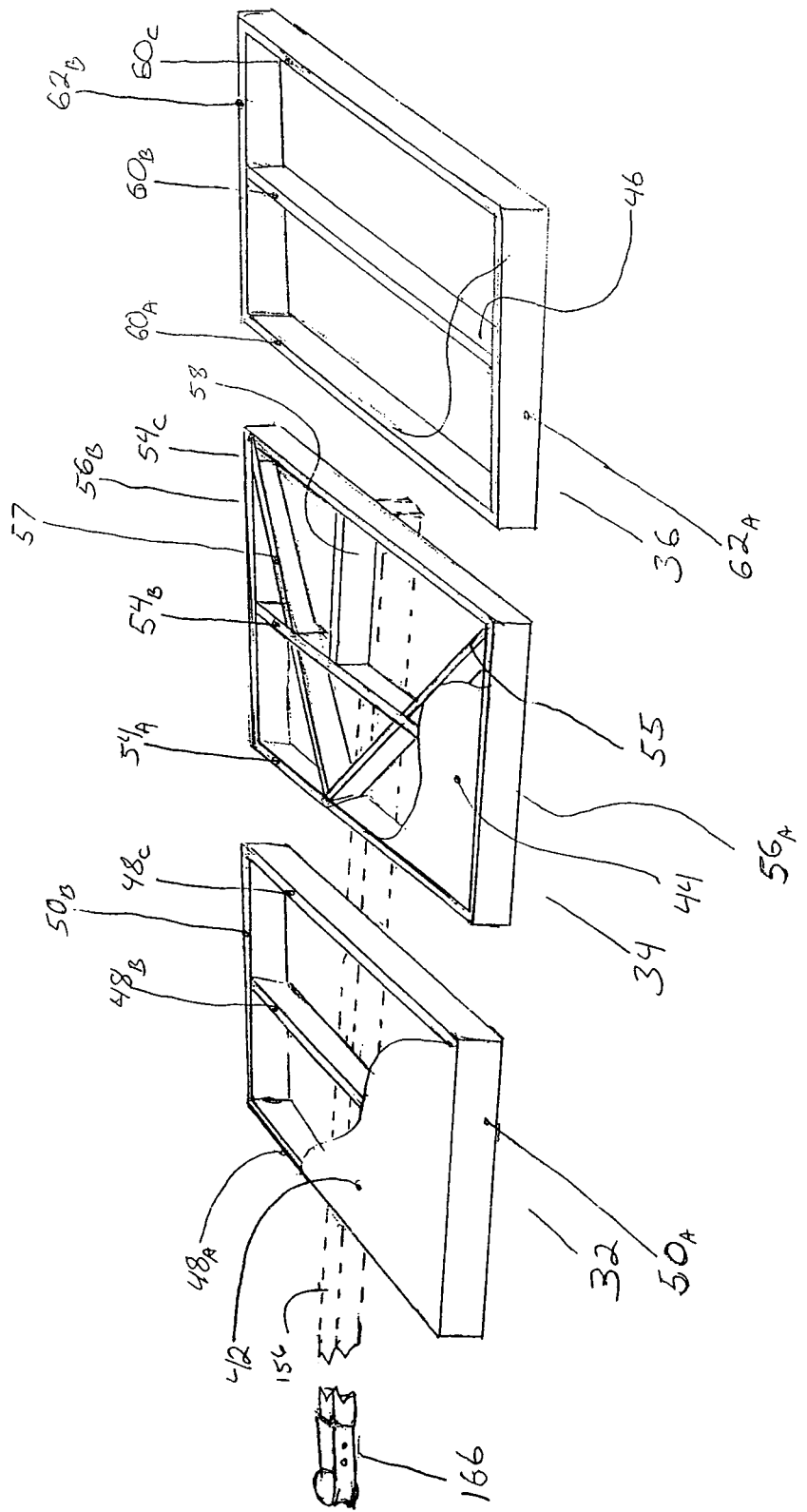
FIG. 3 illustrates an embodiment of the folding frame sections of a folding vehicular utility trailer.

FIG. 3 illustrates an embodiment of the folding frame sections of a folding vehicular utility trailer. The front trailer section 32 comprises a front bed floor 22, a front cross-member 48a, a middle cross-member 48b, and a rear cross-member 48c. All three front cross members 48a, 48b, 48c of the front frame section 42 (chassis) attach on the outboard sides, which are the left and right front frame side rails 50a, 50b.

The center trailer section 34 comprises a center bed floor 24, a front cross member 54a, a center cross member 54b, and a rear cross member 54c. All three cross members 54a, 54b, and 54c of the center frame section 34, attach on the outboard sides to the left and right center frame side rails 56a, 56b. The center trailer section 34 also utilizes two additional reinforcing diagonal frame members 55 and 57 creating a figure "A" and an additional vertical reinforcing center frame member 58 that is attached to the middle of the front cross member 54b and spans to the middle of the rear cross member 54c. The center trailer section 34 is the structural foundation for the trailer to which all the rest of the trailer sections are attached. As detailed if FIGS. 1 and 2, the center trailer section 34 attaches to the trailer tongue 156, axle 138, springs 134 and front and rear trailer sections 32 and 36.

The rear trailer section 36 comprises a rear bed floor 26, a front cross-member 60a, a middle cross-member 60b, and a rear cross-member 60c. All three cross members 60a, 60b, 60c of the rear frame section 36 attach on the outboard sides, which are the left and right front frame side rails 62a, 62b.

In this embodiment, the front trailer section 32 also comprises the front end barrier 70. The front end barrier further comprises the front end barrier tube rail 72 and front end barrier skin 74. The front end barrier 70 rotates ninety-degrees in either direction from the vertical points of attachment 73a, 73b (as detailed in FIG. 6) so that it may either lay flat towards the front of the trailer, or to the rear of the trailer. The front end barrier 70 is attached to the structure of the front trailer section 32 utilizing flat plate hinges 76. As detailed in FIG. 5, the flat plate hinge 76 utilizes two components; a flat hinge plate 77, and a hinge plate vertical support member 84. The flat plate hinge 77 is interchangeable to any lateral side of the trailer by simply rotating the hinge plate vertical support member 84 to the desired position on all four corners of the trailer.

Figure 27:
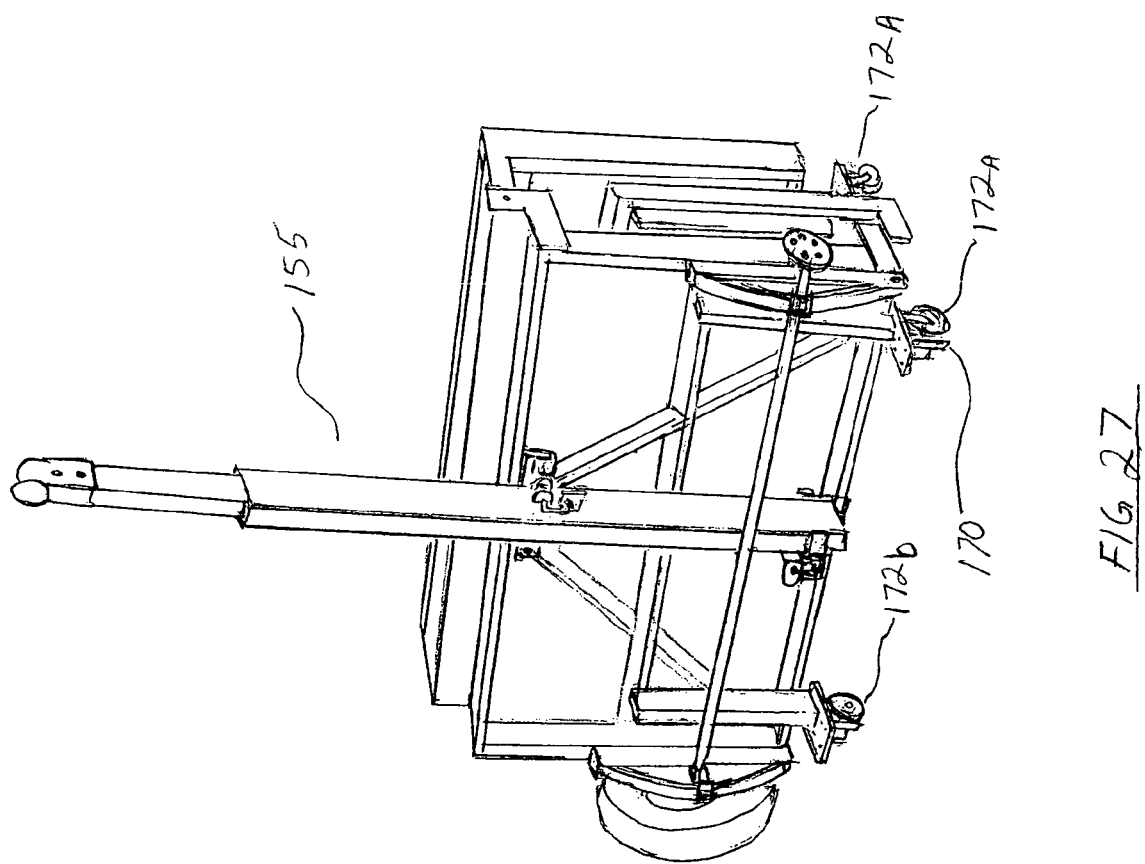
FIG. 27 illustrates an embodiment of a folding vehicular utility trailer with the trailer sections in a fully folded configuration and placed in an upright storage position.

The trailer tongue 156 that connects the center trailer section 34 to the towing vehicle serves three functions in the disclosed embodiments. First, the tongue 156 acts as a fulcrum to rotate the trailer from a horizontal towing configuration (as shown in FIG. 1) to a vertical stored configuration (as shown in FIG. 27). Second, when the trailer is in this vertical stored configuration, the tongue 156 may rotate ninety-degrees in either direction, from the twelve o'clock position, to the three and nine o'clock positions, (i.e., a horizontal position), for additional storage room and removal of its use as a fulcrum, which provides safety from unintentional rotation from a vertical stowed position, to horizontal tow position (see FIG. 29). The third function of the tongue 156 is its utility as a handle to maneuver the trailer upon the casters 172 (detailed in FIGS. 27 and 29) when folded into the storage vertical configuration.

Figure 4:
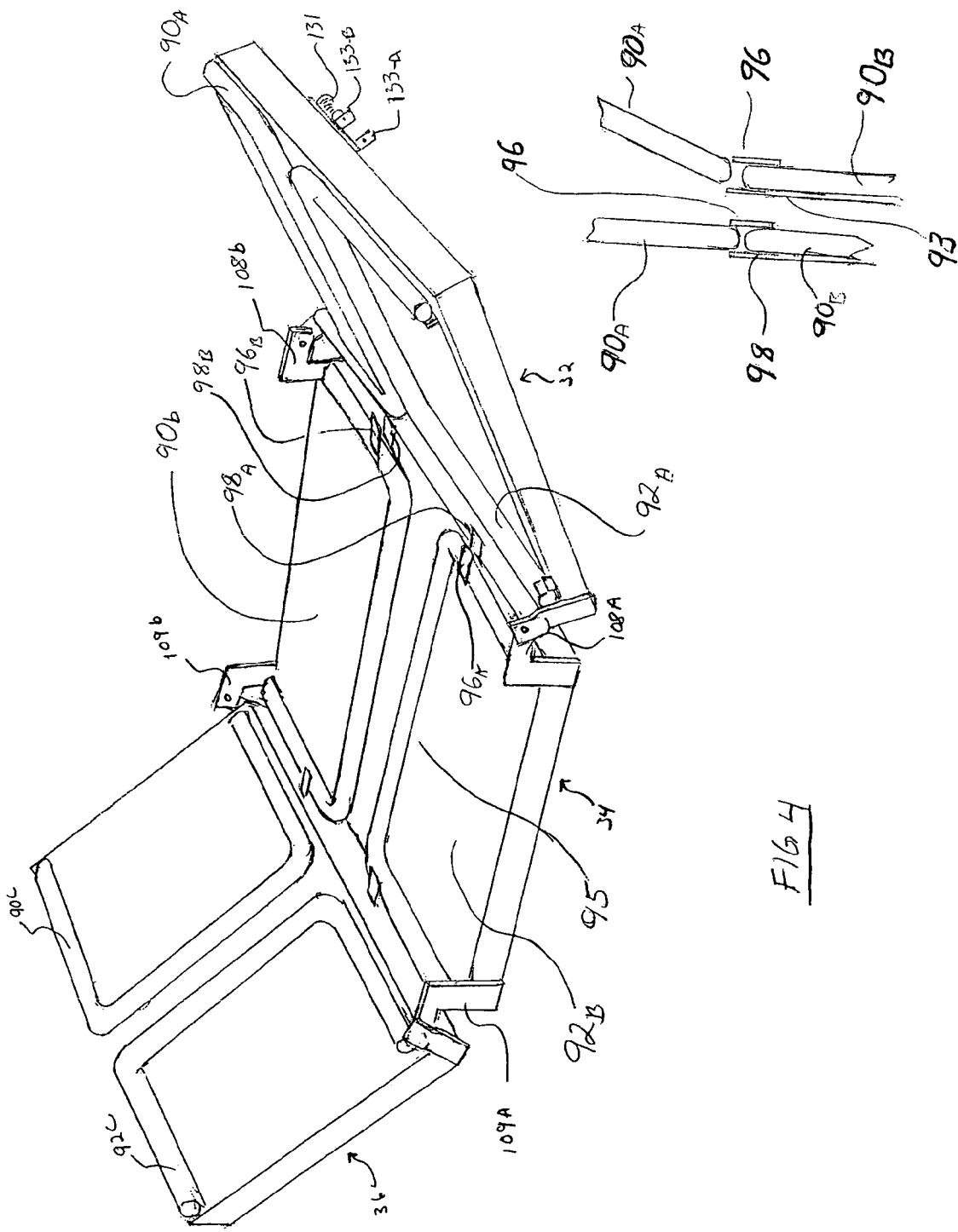
FIG. 4 illustrates an embodiment of the hinged frame sections of a folding vehicular utility trailer.

FIG. 4 illustrates an embodiment of the hinged frame sections of a folding vehicular utility trailer. As detailed in FIG. 4, all of the side barriers 90, 92 and end barriers 70, 110 are folded into their flat configuration. This allows the rear trailer section 36 to pivotally hinge and rotate forward about a pair of rear side barrier hinge 109a, 109b, thereby allowing the bed section to be placed on top of the center trailer section 34. Similarly, the front trailer section 32 may also pivotally hinge and rotate rearward about a pair of front side barrier hinges 108a, 108b thereby allowing the bed section to be placed either directly on top of the center trailer section 34 or upon the rear trailer section 36 that is in the folded configuration.

Figure 5:
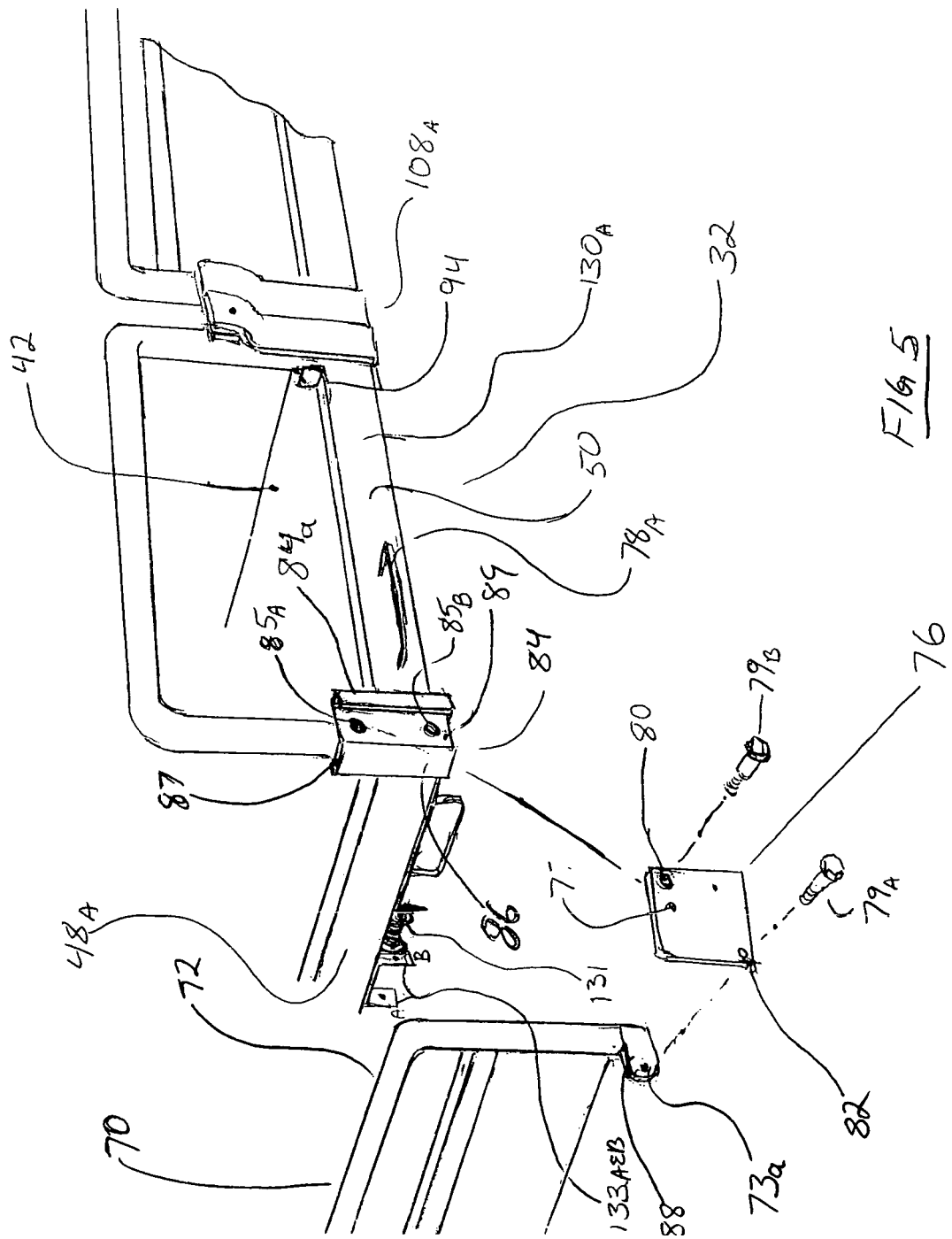
FIG. 5 illustrates the containment sections of an embodiment of a folding vehicular utility trailer.

FIG. 5 illustrates the containment sections of an embodiment of a folding vehicular utility trailer. As shown in FIG. 5, the flat plate hinges 76 have two hinge plate aperture points of attachment 80, 82 at opposite diagonal corners of the flat hinge plate 77. The hinge plate aperture points of attachment 80 function by utilizing bolts 79b, which pass through apertures 80 in the flat hinge plate 77 and the hinge plate vertical support member aperture of attachment 85a of the hinge plate vertical support members 84 (see exploded portion of FIG. 5). The point of attachment of the lower hinge plate aperture 82 allows the front end barrier 70 and rear end barrier 110 to be attached to the front trailer section 32 and rear trailer section 36 respectively (see FIG. 6 and FIG. 20).

Figure 22:
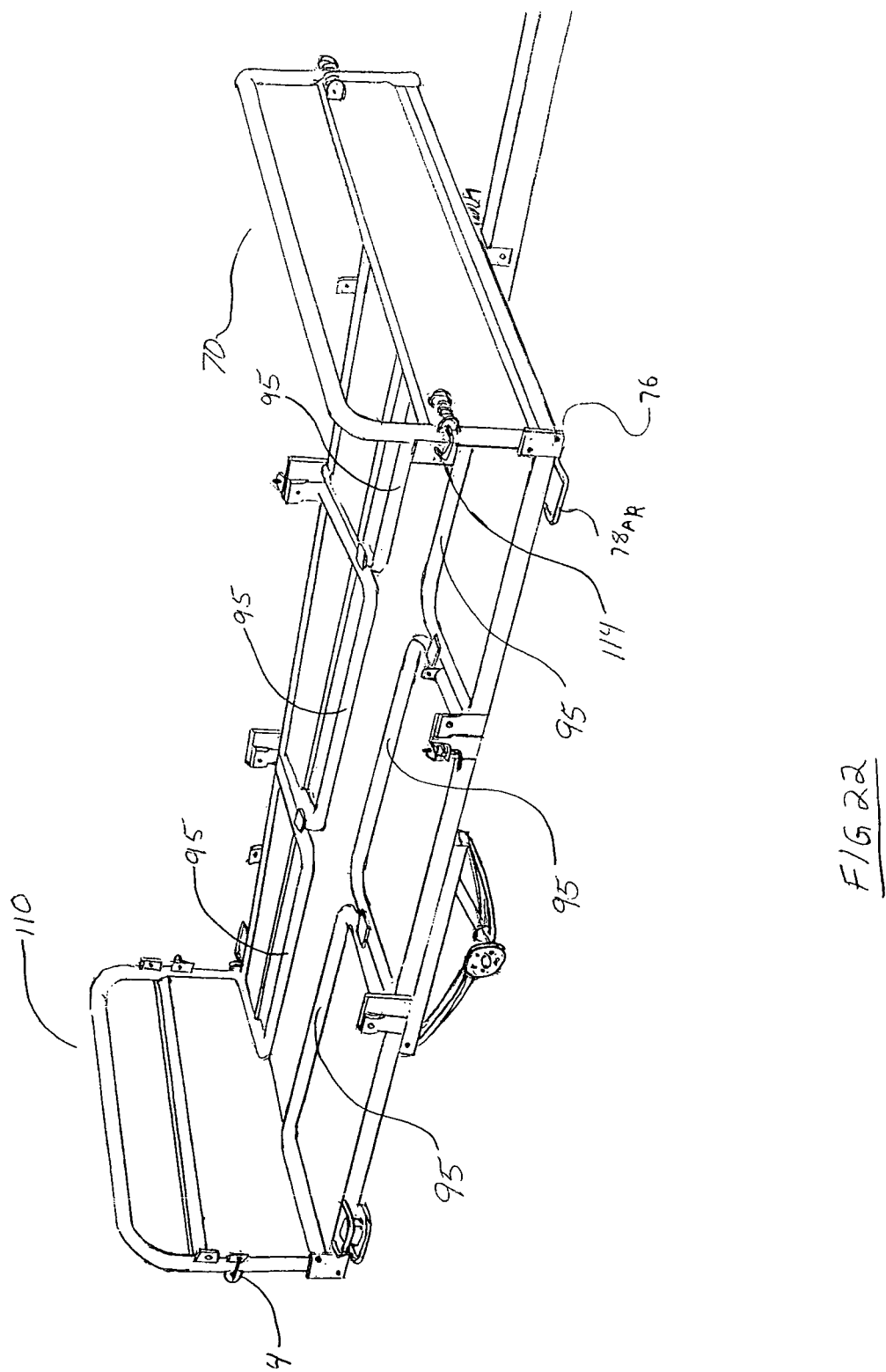
FIG. 22 illustrates an isometric view of an embodiment of a folding vehicular utility trailer with the side containment panels fully folded.
Figure 23:
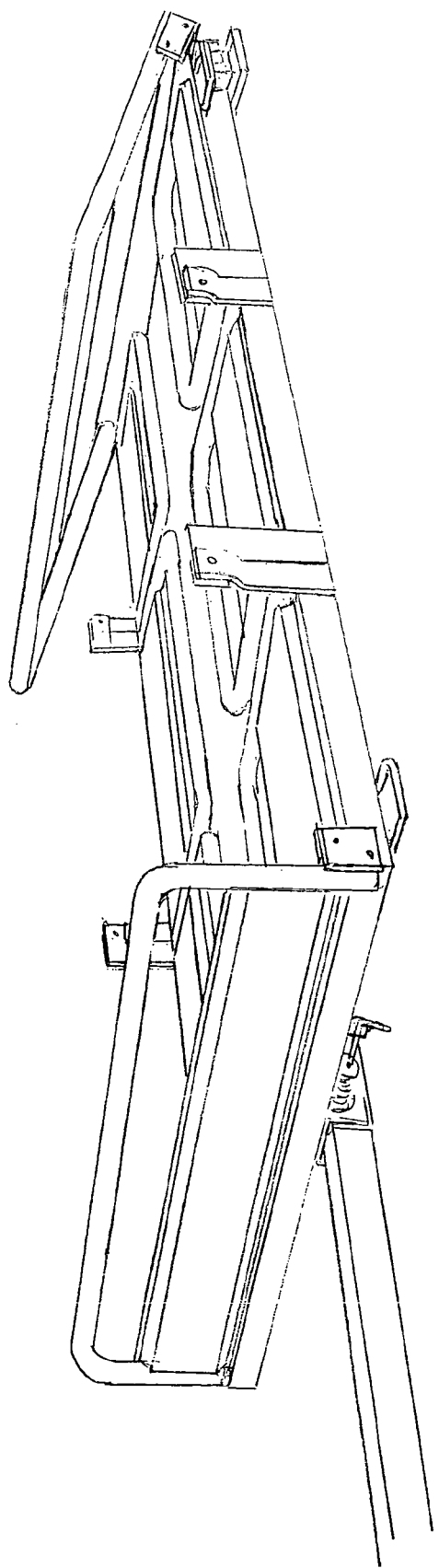
FIG. 23 illustrates an isometric view of an embodiment of a folding vehicular utility trailer with the side containment panels fully folded and front and rear panels partially folded.

Attached to the bottom portion of the front and rear end barrier tube rail 72, is an extension arm 88 that extends outward from the front and rear end barrier tube rail 72 at ninety-degrees. This extension arm 88 creates a moment between the hinge plate aperture point of attachment 82, and the end barrier tube rail 72, thereby enabling the end barrier to exert a downward force causing rotation when positioned vertically to the plane of the front trailer section 32 and rear trailer section 36. This rotation causes the hinge plate vertical support member 84 and the rest point plane 86 to exert a force back against the end barrier tube rail 72, thereby stopping the rotation of the front end barrier 70 and the rear end barrier 110. As further detailed in FIG. 22, this moment between the extension arm 88, the vertical support member 84, and the trailer front and rear end barriers 70, 110, allows for these end barriers 70, 110 to remain vertical and upright while the trailer is at rest. This feature is exemplified in the folded configuration depicted in FIG. 24, which allows either of the end barriers 70, 110 to remain in a stand-alone vertical position while the side barriers 90, 92 are manipulated into the vertical (up) or horizontal (down) position.

The rest point 87 of the hinge plate vertical support member 84 extends high enough above the folded side barriers 90a, 90b, 90c, 92a, 92b, 92c, which are resting flat on the bed floor so that the hinge plate vertical support member 84, in conjunction with the flat hinge plate 77, to allow the front and rear end barriers 70 and 110 to be folded up over the rest point 87 as well as the side barriers 90, 92. When positioned in this configuration, the hinge plate 77 is rotated out of the U-Stop 84a on the vertical support member 84. The hinge plate vertical support member 84 is "L" shaped and also comprises a U-stop 84a containing two holes 85a, 85b. When the end barriers 70, 110 are moved into a vertical position as exemplified in FIGS. 1, 21 and 22, or in a flat outboard position as exemplified in FIG. 20, the hinge plate 77 is engaged by the U-stop 84a and provides lateral stability to the flat hinge plate 77.

Figure 10:
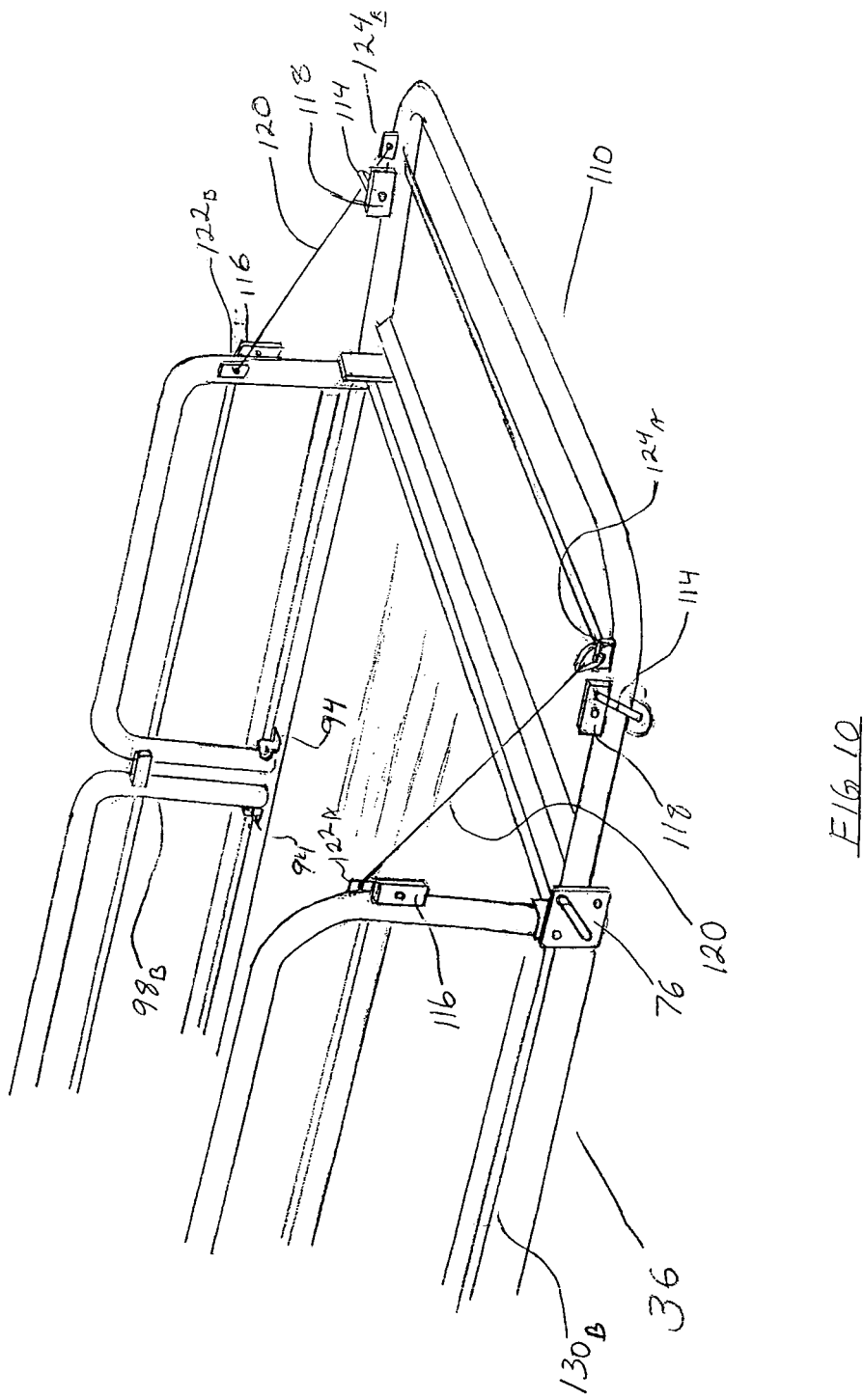
FIG. 10 illustrates the containment sections of an embodiment of a folding vehicular utility trailer.

FIG. 10 illustrates the containment sections of an embodiment of a folding vehicular utility trailer. As detailed in FIG. 10, an end barrier cable 120 located on both the left and right sides of the end barriers 70, 110 are attached by the upper and lower end barrier cable tabs 122a, 122b and 124a, 124b respectively. These end barrier cables 120 allow the end barrier 110 to be lowered and retained in a flat orientation much like the open tailgate of a pickup truck.

As further detailed in FIG. 13 and FIG. 14, the front side barrier hinges 108a, 108b and the rear side barrier hinges 109a, 109b are each comprised in this embodiment of two pieces. This involves an inverted "L" member 102a, 103a that interfaces with an offset brace 102b, 103b by means of a pivot 104, 105. This pivot interface comprises a pair of through-holes placed at the horizontal leg of the inverted "L" 102a, 103a, and at distal end of the offset brace where a pivot 104, 105 (e.g., bolt or rivet or the like) passes through the apertures and allows rotation (see FIG. 15). The vertical height of the rear side barrier hinges 109a, 109b is shorter than the vertical height of the front side barrier hinges 108a, 108b. This allows the stacking of the front trailer section 32 on top of the rear trailer section 36 when the trailer is in a folded configuration.

The front and rear side barrier hinges 108, 109 serve multiple functions within the folding vehicular utility trailer. The rear side barrier hinge 109 rotates and allows the rear trailer section 36 to transition to a folding position along with the folded side barriers 90c, 92c and the folded end barrier 110. This assembly rotates up and over the top of the center trailer section 34 including the folded center side barriers 90b, 92b. The front side barrier hinge 108 similarly rotates and allows the front trailer section 32, along with the folded side barriers 90a, 92a and folded end barrier 70, to rotate up and over the top of the stacked rear trailer section 36 and center trailer section 34 (see FIG. 26). This rotation is facilitated with two rear side barrier hinges 109a, 109b one on each side of the center and rear trailer sections 34, 36. This same type of hinged rotation is repeated with the two front side barrier hinges 108a, 108b on each side of the front and center trailer sections 32, 34.

Figure 11:
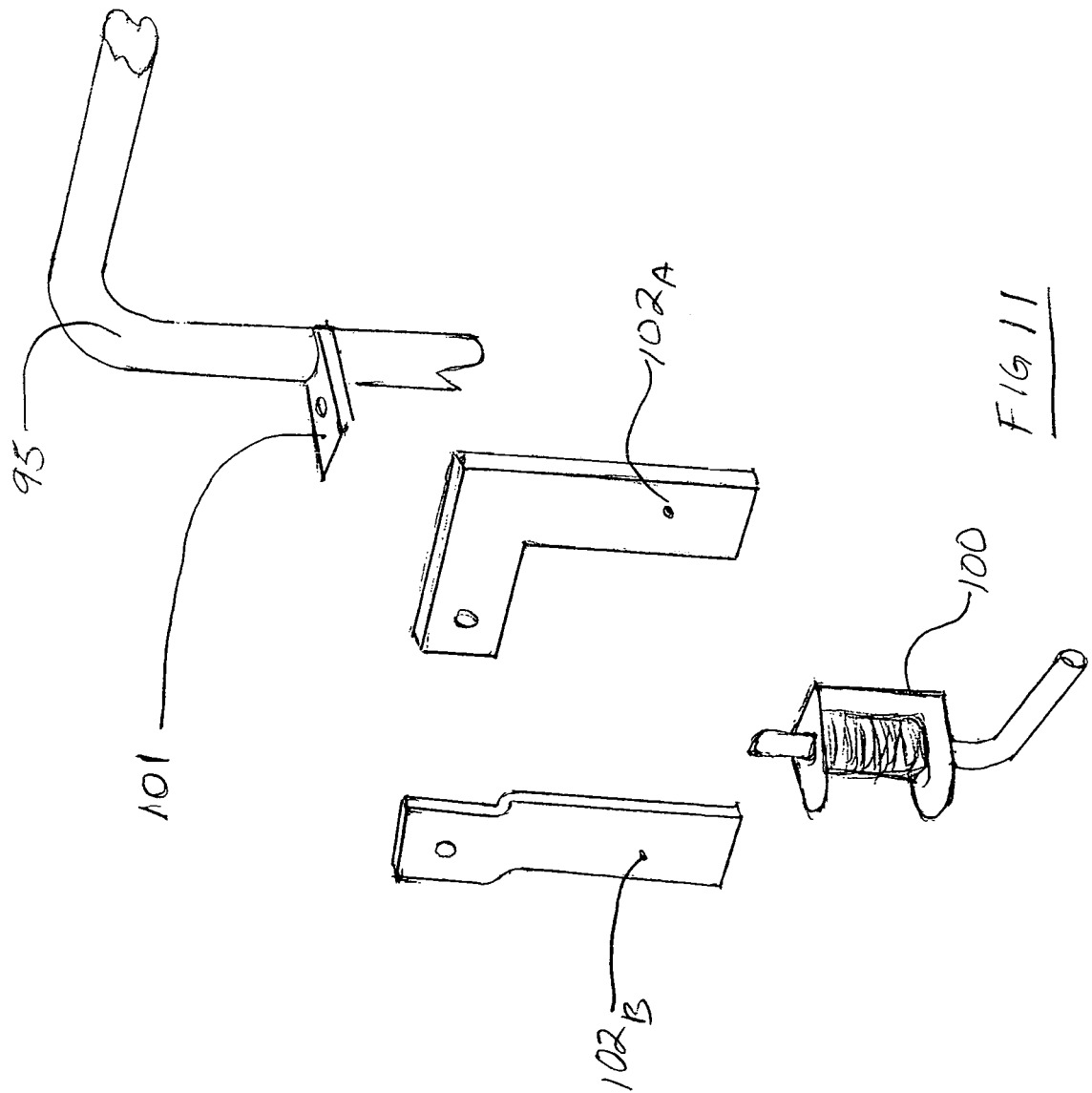
FIG. 11 illustrates a latching mechanism of an embodiment of a folding vehicular utility trailer.

The front and rear side barrier hinges 108, 109 additionally serve to stop the rotation of the side barriers 90, 92 from moving outward beyond ninety degrees when the side barriers 90, 92 are in a vertical position. This is accomplished by providing a stop in conjunction with a spring latch 100 and a locking tab 101 (see FIG. 11). With the side barrier 90, 92 in a vertical position, the bed sections may lock in the open position (see FIG. 27). The side barrier hinges 108, 109 must also translate the stacked collection of the outer front and rear trailer sections horizontally and away from one another so that when they are rotated and stacked, their rotated inner edges do not strike each other. When the front trailer section 32 is folded up and over the rear trailer section 36, this translation and the sequence of its operation provides stability and utilizes the weight of each successive layer to provide a secure placement of the trailer sections in both the folded and storage configurations. When the trailer sections are rotated vertical, the above layered method and sequence prevents the trailer sections from opening. The side barrier hinge 108, 109 design's utilization of gravitational forces that inhibit the trailer sections from configuration transition in the open and folded configuration.

The side barrier hinges 108, 109 facilitate horizontal translation of the front and rear trailer sections 32, 36 by utilizing a displacement of the pivot (point of rotation) 104, 105 on the horizontal leg of the inverted "L" 102a, 103a, which facilitates a displacement of the part line 106, 107 when the side barrier hinge 108, 109 is rotated.

Figure 15:
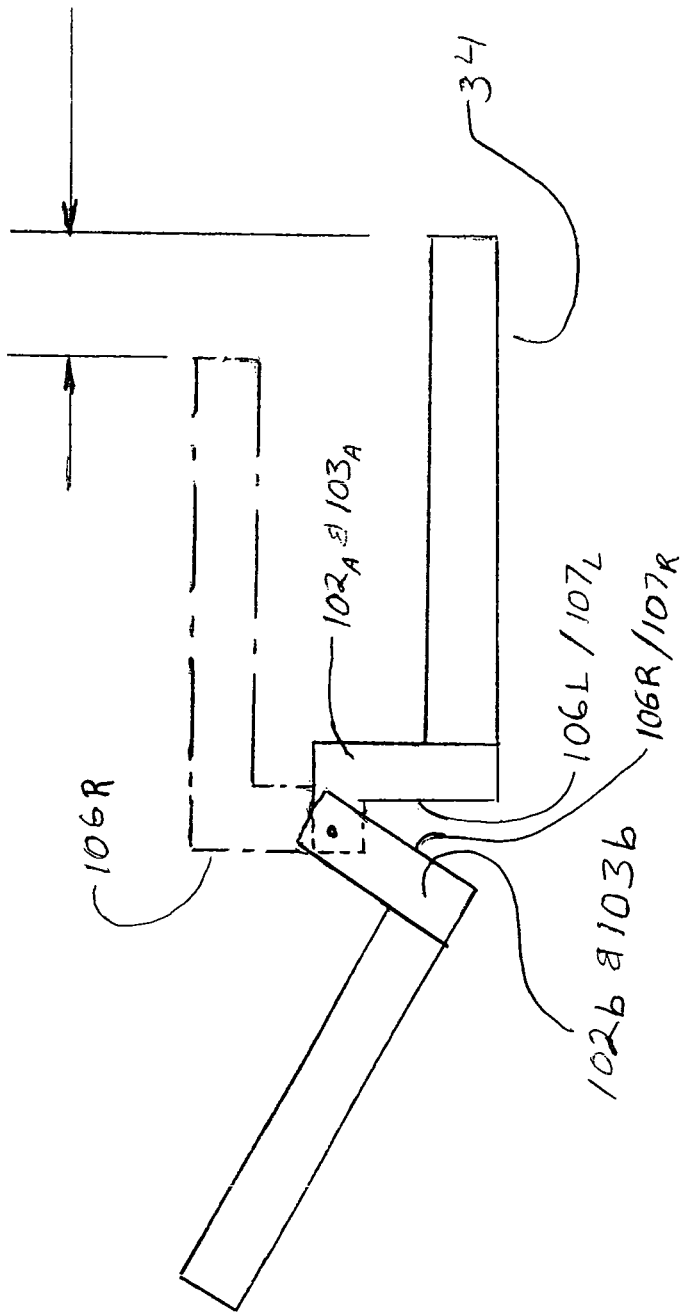
FIG. 15 illustrates a hinge and retainer mechanism of an embodiment of a folding vehicular utility trailer.

Figure illustrates a hinge and retainer mechanism of an embodiment of a folding vehicular utility trailer. As shown in FIG. 13, the inverted "L" 102a of the front side barrier hinge 108a, is positioned at an offset distance to one side (shown in FIG. 13 to the right), and the offset brace 102b is positioned at an offset distance to the opposing side (shown in FIG. 13 to the left), to the left of the part line 106. The part line 106 is shown to the right of the pivot (point of rotation) 104. FIG. 15 further illustrates the part line 106 comprising a right side 106R of the offset brace 102b and left side 106L of the inverted "L" 102a. Both of these parts 106R, 106L come in contact to form the part line 106. The inverted "L" 102a is affixed to the center frame side rail 56a with the pivot (point of rotation) 104 extended out over the outer front trailer section 32.

When front trailer section 32, is rotated 180 degrees, from the open position, up and over the top of the center trailer section 34, the offset brace 102b side of the part line 106R is facing in the opposite direction, from the open trailer position. The offset brace 102b and its side of the part-line 106R are now facing to the left, where when un-rotated 106R was facing to the right. The difference in the horizontal distance from the left to the right of the offset brace side of the part-line is the horizontal distance of the transition backwards of the front trailer section 32. This results in a backward transitional distance that prevents the outer portion of the front trailer section 32 from striking the rear trailer section 36 when they are both rotated over the center trailer section 34. The same backward transitional distance described above, applies to the rear bed section 36 and its side barrier hinge 109.

Figure 26:
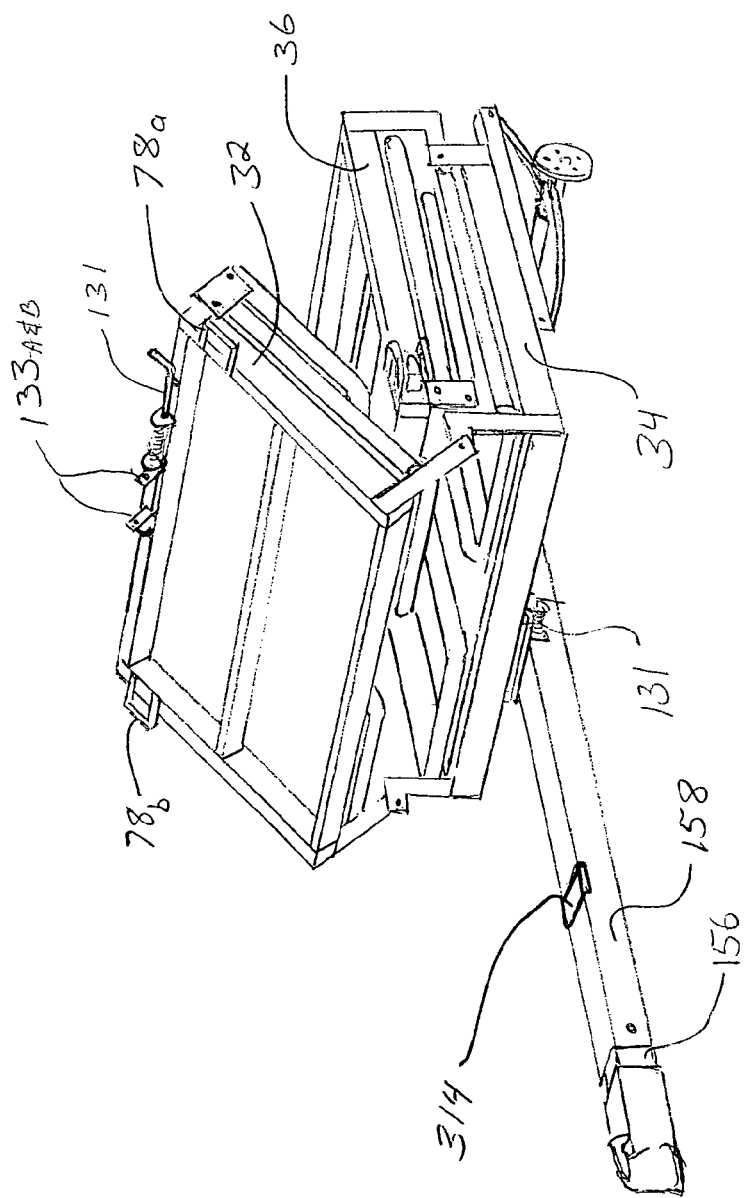
FIG. 26 illustrates an isometric view of an embodiment of a folding vehicular utility trailer with the rear trailer section fully folded and the front trailer section partially folded.

Another advantage of the operation and design of side barrier hinges 108, 109 is that they allow vertical stacking/layering of all the trailer components (i.e., trailer sections 32, 34, 36 as well as the folded side and end barriers 90, 92, 70, 110 in a condensed layered manner (see FIG. 26). As mentioned above, to facilitate this stacking/layering, the rear side barrier hinges 109 are shorter than the front side barrier hinges 108. The pair of upside inverted "L" hinges 102a, 103a are fixed to the center trailer section corners 34 with the horizontal part of the "L" and rotational point 104,105 being out over the outer folding section 32 and 36. The vertical portion of the inverted "L" hinges 102b, 103b are fixed to the adjacent adjoining corners of the front and rear trailer sections 32, 36. This offset vertical part 102b and 103b fits any adjacent corner by just rotating it about the vertical axis 180-degrees. The arm length of the rear side barrier hinge 109 is determined by dividing the combined thickness of the rear trailer section stack and the center trailer section stack by two, then adding the bolt diameter. The arm length of the front side barrier hinge 108 is determined by dividing the additive of the rear trailer section stack thickness, the center trailer section stack thickness and the front trailer section stack thickness, by two, then adding the bolt diameter. By vertically stacking (layering) the bed sections utilizing the side barrier hinges 108, 109, the mass of the trailer sections 32, 34, 36 is collected into a tight condensed space maximizing the reduction in volume from an open configuration, to compact configuration, to a stored configuration.

When the trailer is in a folded configuration, with the front trailer section 32 folded over the top of the rear trailer section 36, it is then easily rotated as a unit from a horizontal stack to a vertical stack (stowed configuration). In this orientation, the hinge mechanisms continue to prevent opening of the sections utilizing gravitational force to keep the sections intact.

This is facilitated by the folding sequence. In the open configuration, the front trailer section 32 and rear trailer section 36 also utilize gravitational forces in combination with the moments of the trailer sections and the moment arms created by the offset braces 102, 103 to maintain an open and stable condition. Therefore, the need for locking mechanisms is unnecessary. This reduces part count, complexity, weight and cost, while increasing safety, simplicity and reliability. The reason locking mechanisms are unnecessary, is that the force acting over a distance from a point of rotation of the offset aperture 104, 105 to the free opposite end of the rear trailer section 34 and the front trailer section 32. The gravitational force in this embodiment is pulling down on the front and rear trailer sections 32, 36 at a normal angle to the inverted "L" 102b, 103b in conjunction with the length of the arm down from the rotational point 104, 105, thereby exerting a large closing force on the part line 106, 107 of the hinge.

Without the need to latch and unlatch any items, the transition time for changing configurations is lessened. The side barrier hinge 108, 109 additionally transfers the entire weight of the front and rear trailer section 32, 36 to the center trailer section 34, and no additional support is required to transfer their respective load. When the side barrier hinges 108, 109 are combined with the vertical side barriers, and with inclusion of the vertically mounted spring bolt latch 100 that is mounted to the outside of the inverted "L" 102a of the side barrier hinge 109, and, with a tab 101 and its aperture that is mounted to the side barrier tube 95, the mechanism, and the vertical side barrier, are very stable in the open configuration.

Figure 16:
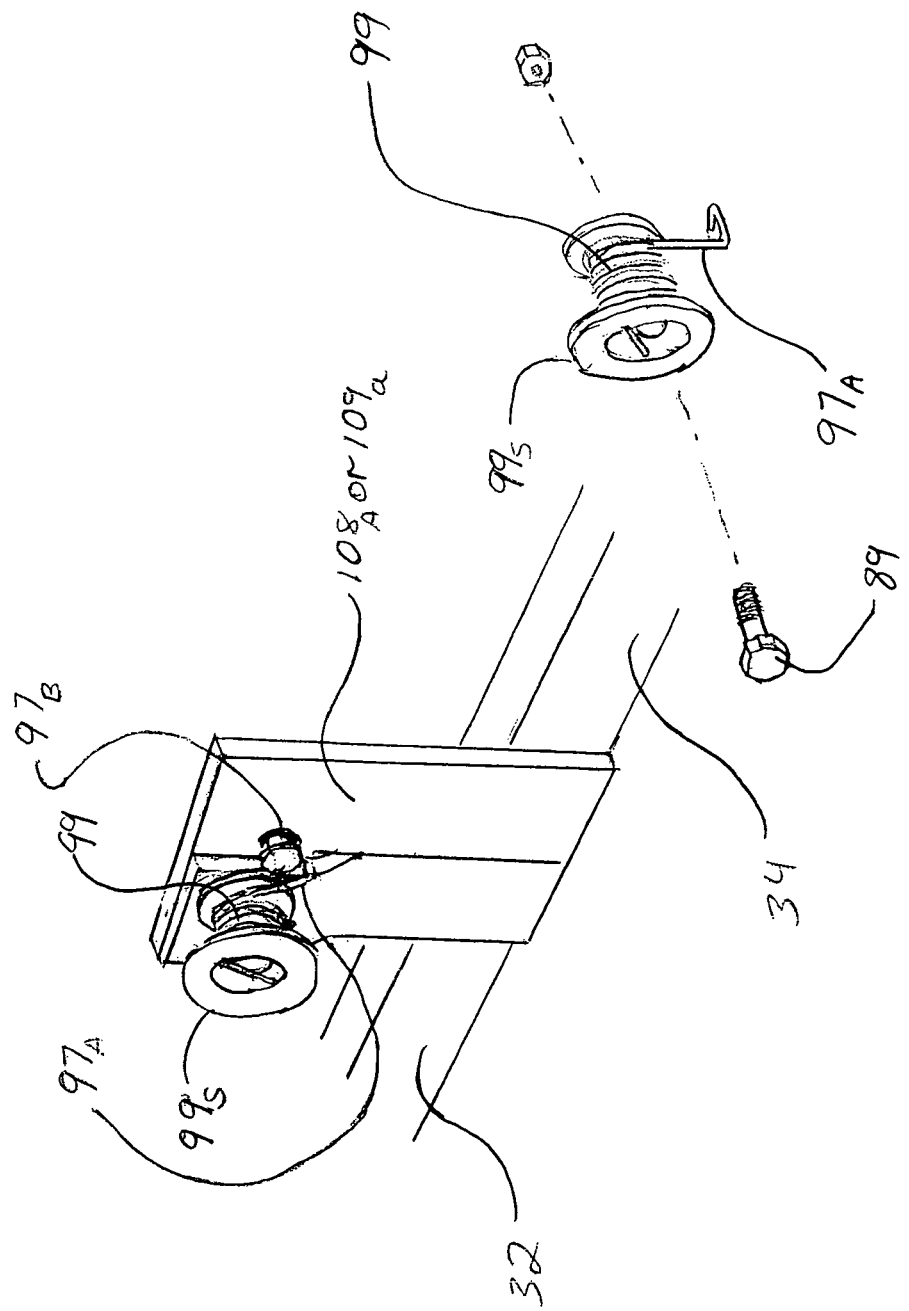
FIG. 16 illustrates a spring hinge and retainer mechanism of an embodiment of a folding vehicular utility trailer.

FIG. 16 illustrates a spring hinge and retainer mechanism of an embodiment of a folding vehicular utility trailer. As shown in FIG. 16, the side barrier hinges 108, 109 may optionally comprise a hinge assist spring 99 and spool 99s that mounts in alignment to offset aperture 104, 105 and the retaining bolt. This spring has two stems 97a, 97b that protrude from the spring and into an aperture (or slots in the transitional side barrier hinge 108 and 109). The weight of the component of the trailer sections 32, 36, as well as the side barriers 90a, 90c, 92a, 92c and the end barriers 70, 110, is offset by the spring forces. Although this transitional hinge spring is not needed for operation, additional ease of use could be realized utilizing a decrease in rotational force when rotating the front and rear trailer sections 32, 36.

Figure 17:
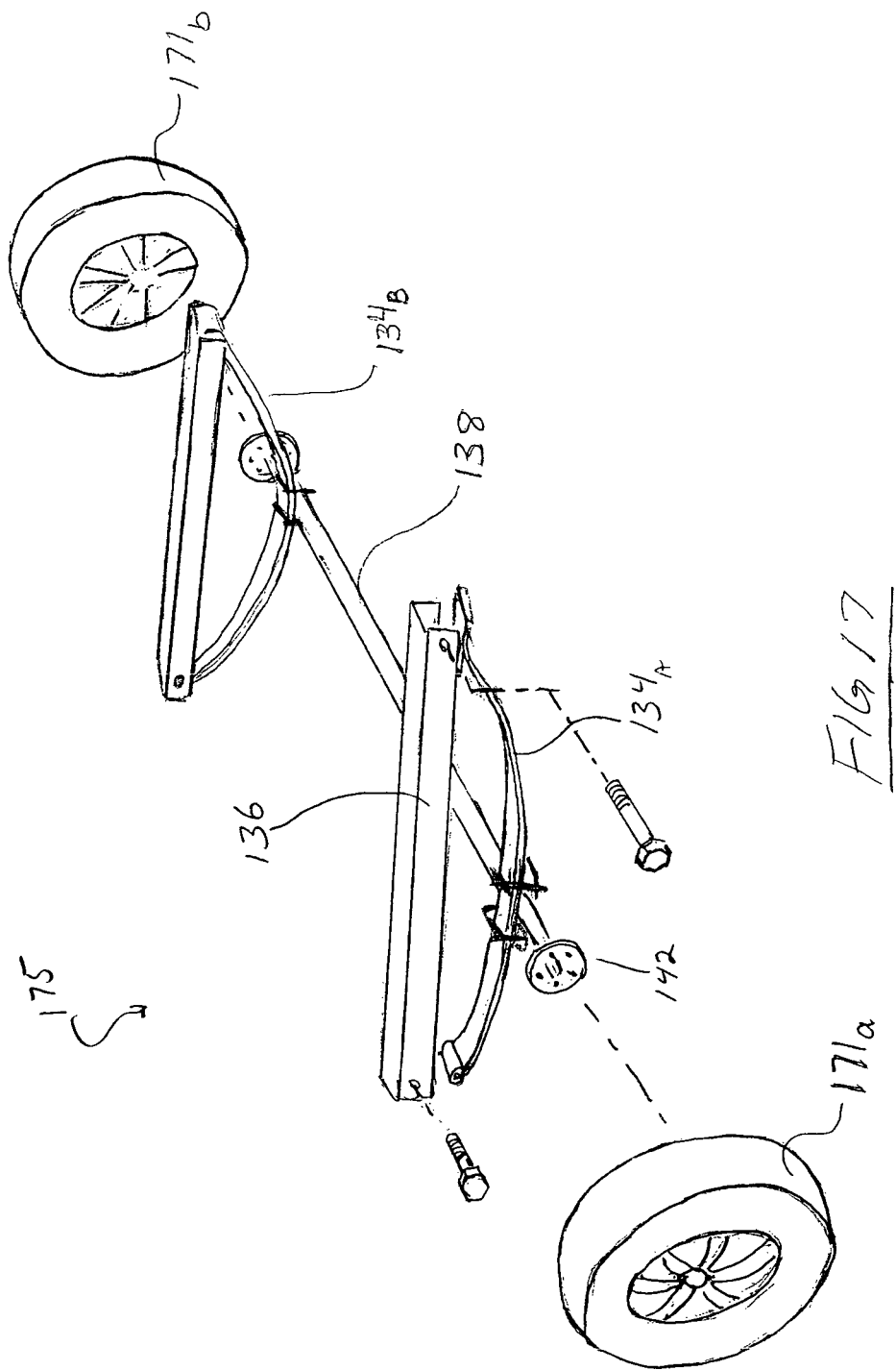
FIG. 17 illustrates a wheel, axle and suspension mechanism of an embodiment of a folding vehicular utility trailer.

FIG. 17 illustrates a wheel, axle and suspension mechanism of an embodiment of a folding vehicular utility trailer. As shown in FIG. 17, an axle spring 134 is attached to a spring channel 136, which is connected to the center frame side rails 56a, 56b. The trailer axle 138 is affixed to the axle springs 134. The trailer tire unit (wheel and tire) 140 is attached to the wheel hub 142, which is attached to the axle 138.

Figure 28:
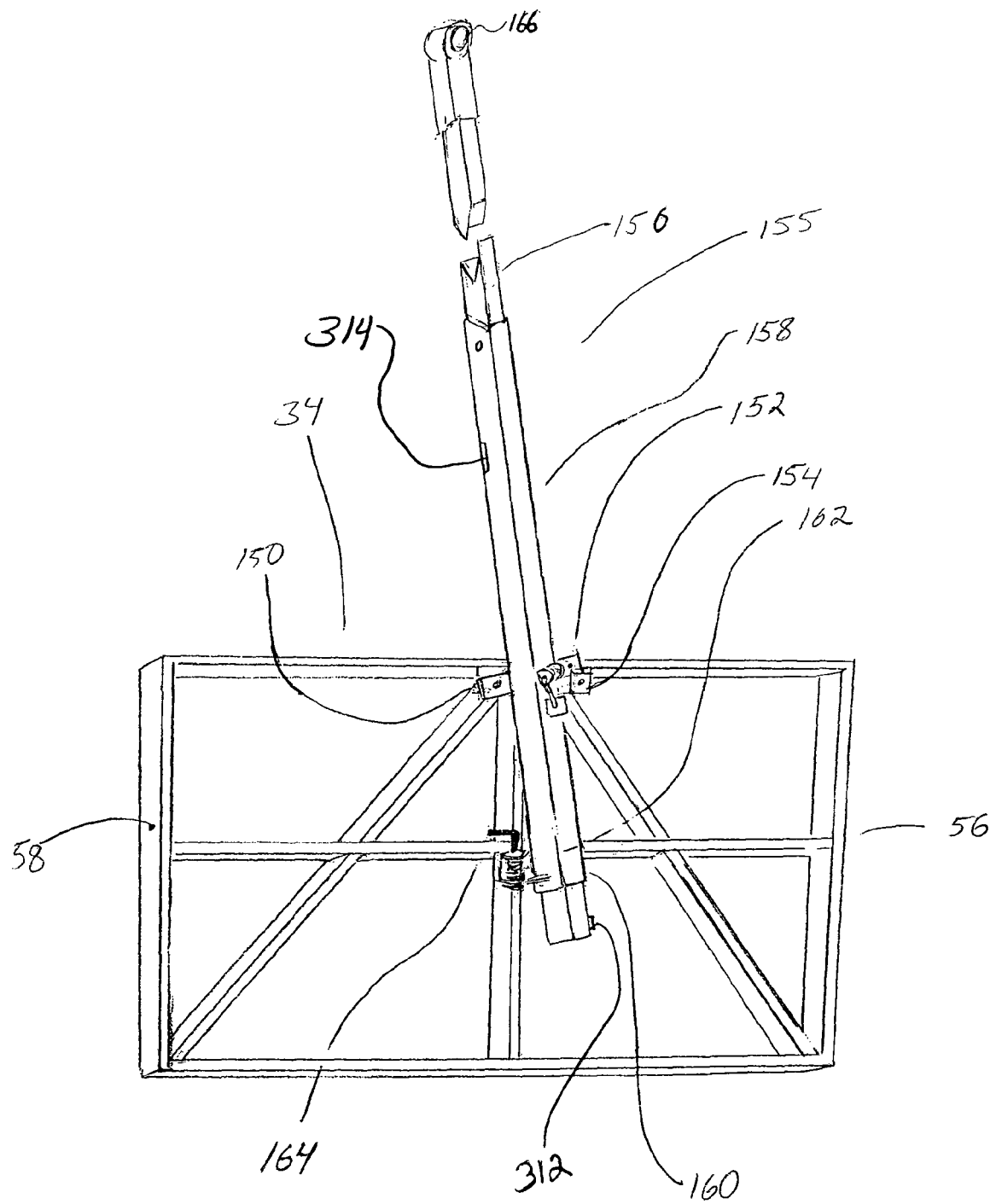
FIG. 28 illustrates an embodiment of a folding vehicular utility trailer showing the pivot function of the trailer tongue.
Figure 29:
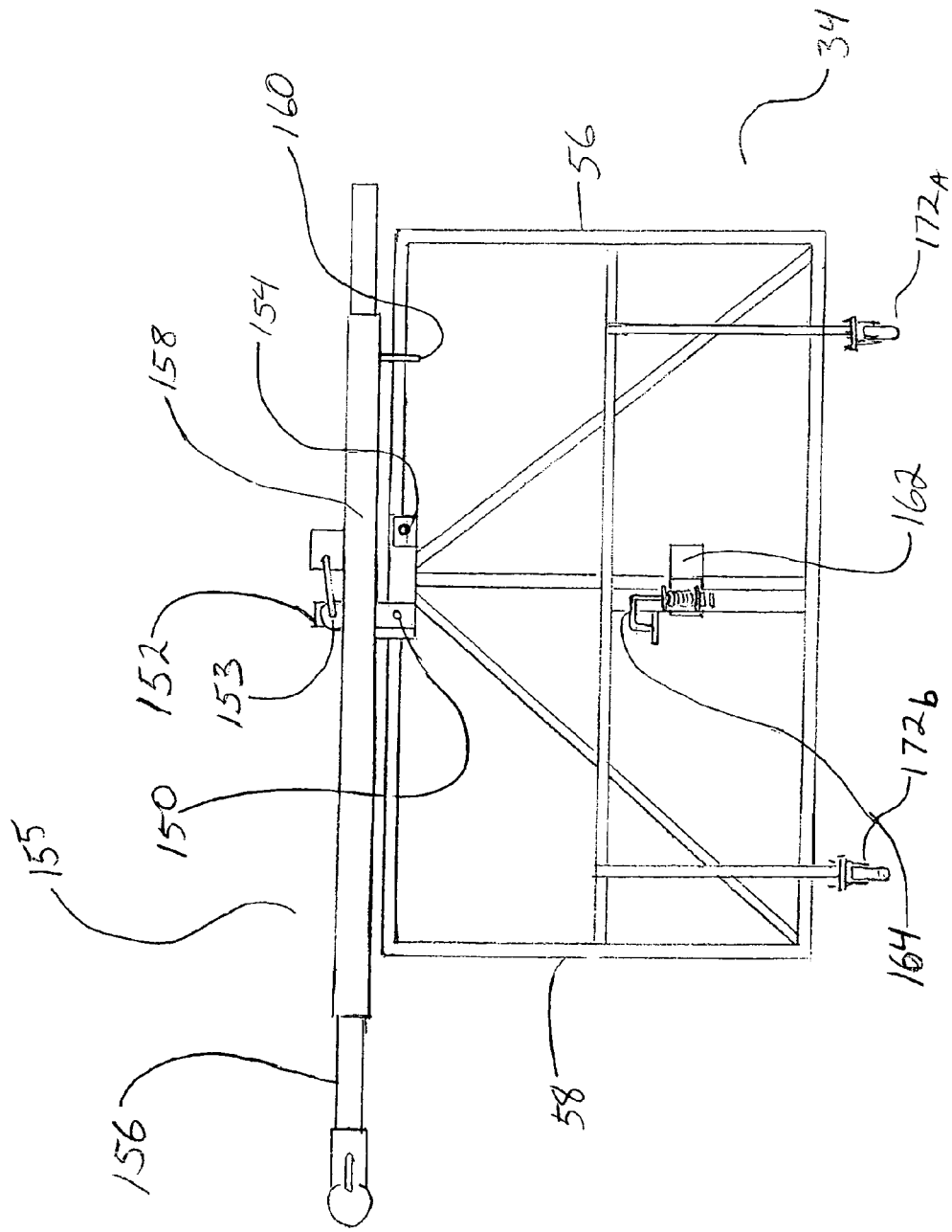
FIG. 29 illustrates an embodiment of a folding vehicular utility trailer with the tongue in a fully folded configuration.

As displayed in FIGS. 27-29, an elongated, multi-length, pivoting tongue assembly 155 has a tongue 156 that extends forward out of tongue slide 158 and is attached to the center frame section 34. The tongue 156 and tongue slide 158 run beneath, but are not attached to the front trailer section 32, until the sway tab saddle 132 is engaged with sway tabs 133a, 133b, and additionally with the locking tongue spring pin 131 (see FIGS. 4 and 5).

Figure 30:
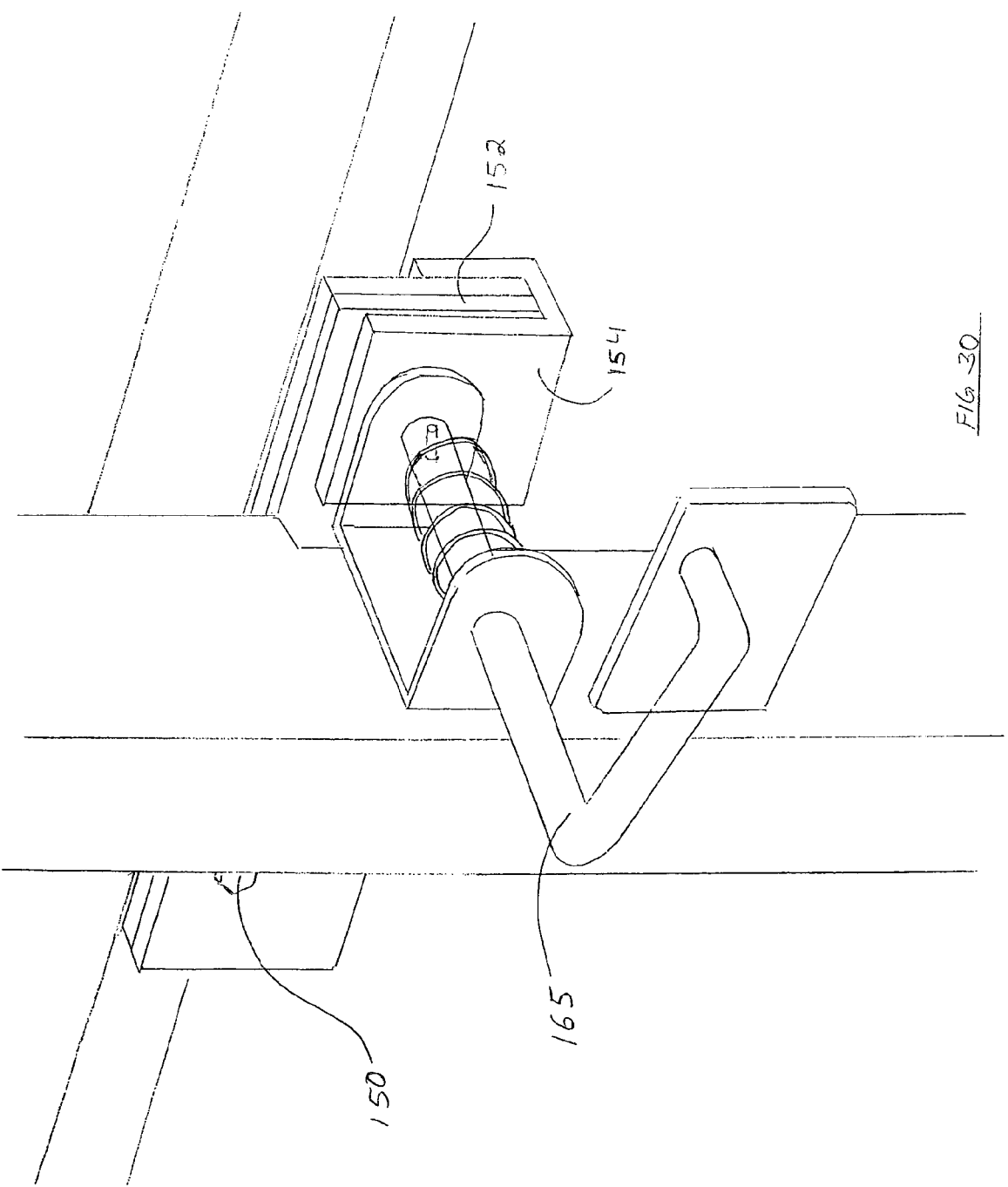
FIG. 30 illustrates a pivot and retainer mechanism for the tongue section of an embodiment of a folding vehicular utility trailer.
Figure 31:
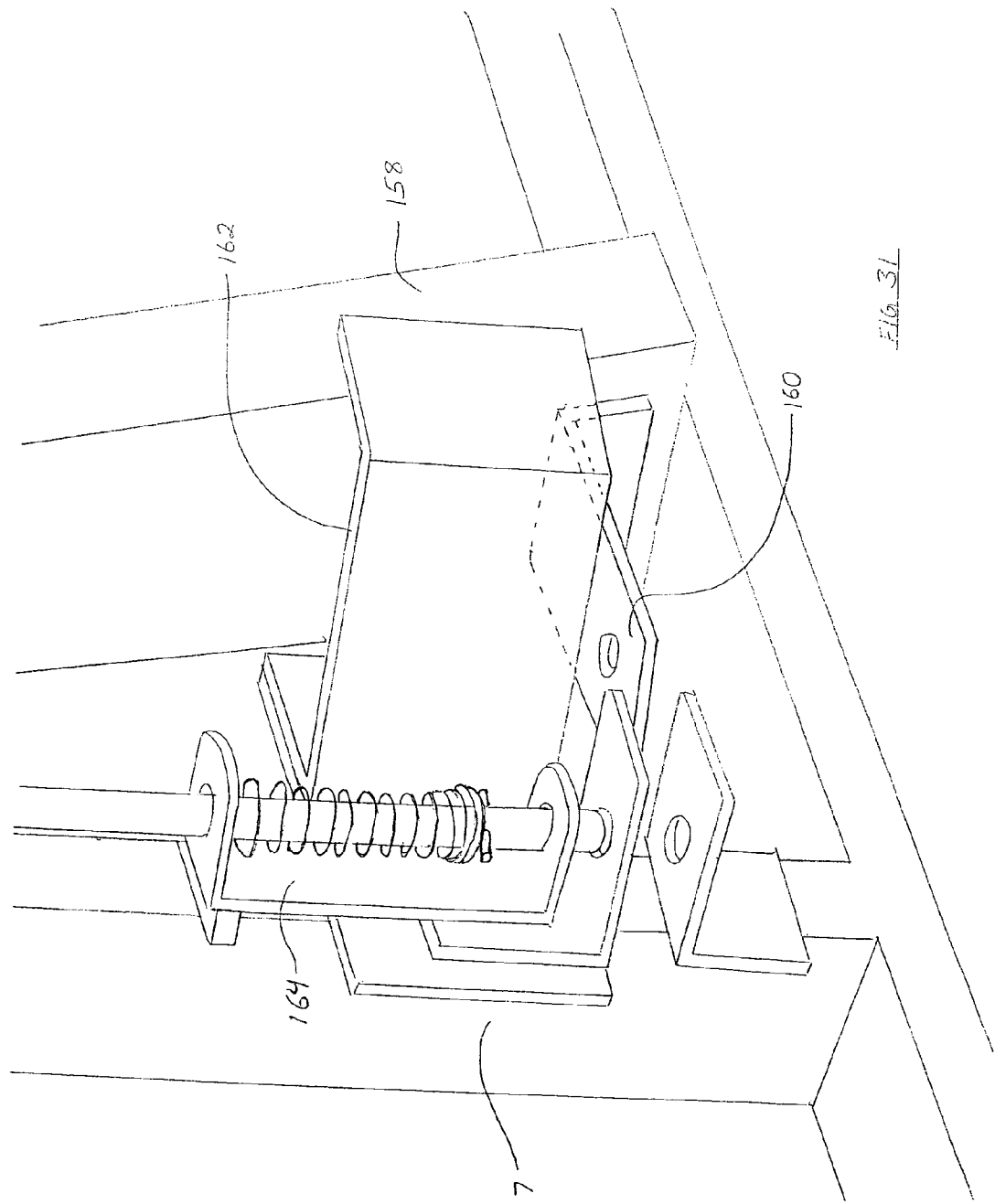
FIG. 31 illustrates another view of a pivot and retainer mechanism for the tongue section of an embodiment of a folding vehicular utility trailer.

The tongue slide 158 is rotatably attached to the center trailer section 34 using a tongue rotatable joint 150 and a center tongue slide locking tab 152, rotated into center torsional tongue slide saddle 154 (detailed in FIGS. 28-30), which is attached to the front cross member 54a and diagonal bed member 55, 57 of the center trailer section 34. The tongue slide is also attached by the rear tongue slide locking tab 160 and the rear tongue slide saddle 162 (further detailed in FIG. 31). As stated above, the tongue slide 158 has two locking tabs, a center tongue slide locking tab 152 and a rear tongue slide locking tab 160.

FIGS. 28-31 illustrate an embodiment where the center tongue slide locking tab 152 and the rear tongue slide locking tab 160 move into the center torsional tongue slide saddle 154 and rear tongue slide saddle 162, when the tongue slide is rotated to a twelve o'clock position. The center torsional tongue slide saddle 154 restricts torsional movement of the tongue slide 158. When rear tongue slide saddle 162 engages the tongue slide 158, it prevents the tongue 156 from moving up and down, while also preventing motion in the front-to-back direction. This engagement also holds the tongue slide 158 parallel to the center trailer section 34. This movement restriction is achieved by fixating the tongue slide saddle 154 and the rear tongue 162, in combination with the tongue slide sway tab saddle 132 engaging tongue slide 158 when the front bed section 32 is lowered onto the tongue slide 158. In addition, the tongue spring pin lock 131, while also engaging the preset aperture in the tongue 156 in place and the tongue slide 158 preset aperture and sway tabs 132a, 132b, thereby securing the tongue 156 in place and adds an additional securing means to hold the tongue slide 158.

The fixated rear tongue slide spring locking pin 164 and the center tongue slide spring locking pin 165 add an additional mechanism of fixation (safety) to the locking of the tongue slide 158 when towing, as well as functioning as a fulcrum for movement of the trailer from the horizontal to the vertical stowed position or visa-versa. The tongue 156 can also be positioned in a telescoping manner, out of the tongue slide, to provide additional and variable tongue length depending upon the needs of the user. This tongue length is locked in place by a tongue spring locking pin 153, when engaged to a preset aperture placed in the tongue 156 and the tongue slide sway tab saddle 132a, 132b aperture. The tongue saddle rear locking assembly 167 is comprised of the rear tongue slide locking tab 160, the rear tongue slide saddle 162 and rear tongue slide spring locking pin 164 and can be attached or positioned in multiple points along the vertical reinforced center frame members 58 of the center trailer section 34 to engage the tongue slide 158. Because the tongue slide 158 and tongue 156 rotate together, and rotate from the three and nine o'clock positions to the twelve o'clock position (and vice versa) with the trailer in the vertical position, many combinations of length of the tongue slide 158 or tongue 156 may be used with a wide variety of trailer sizes.

Figure 18:
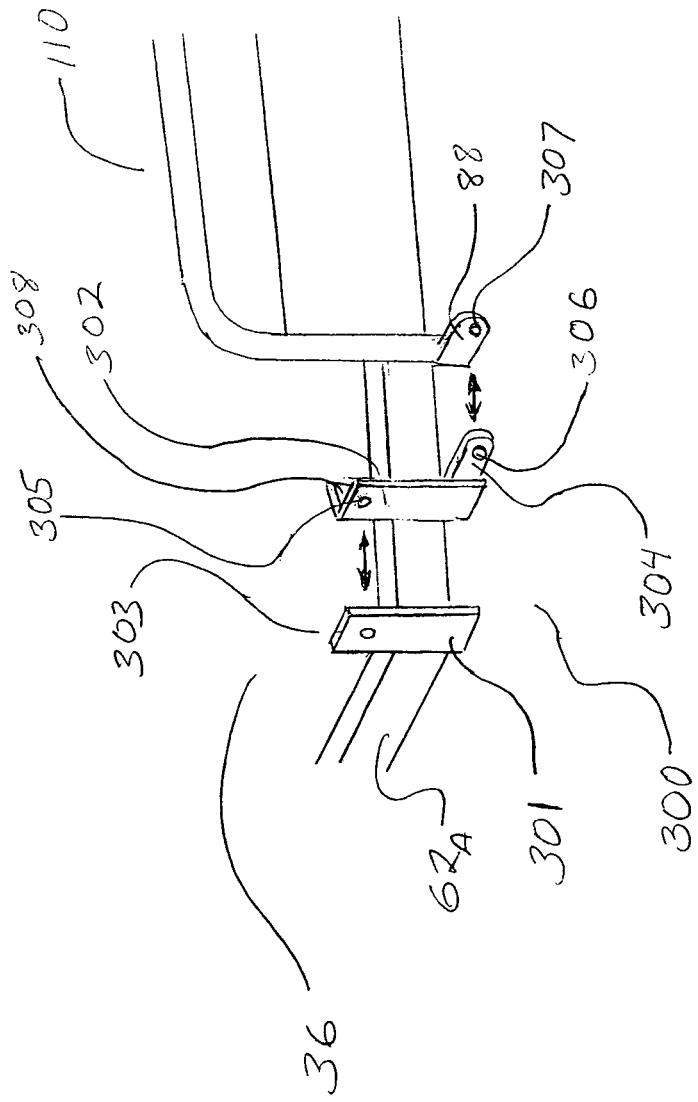
FIG. 18 illustrates another embodiment the containment sections of a folding vehicular utility trailer.

FIG. 18 illustrates another embodiment of the containment sections of a folding vehicular utility trailer. In this embodiment, the flat plate hinge 76 shown in FIG. 4 and FIG. 5 that is used in folding the end barriers 70, 110 on top of the folded side barriers 90, 92, may be replaced with an offset hinge 300. This embodiment is facilitated by a unique right and left hinge. The offset hinge 300 has a vertical support 301 attached to frame side rails 50a, 50b, 62a, 62b and is pivotally attached at the upper corner. The aperture 303 of the vertical support aligns with another aperture 305 of an "L" shaped offset plate 302. An extension arm 304 is located toward the bottom portion of the "L" shape offset plate and is positioned at a ninety-degree orientation outward from the outer ends of the front trailer section 32 and the rear trailer section 36.

At the end of that extension arm 304 is an aperture 306 for attaching the extension arm 88 of the rear end barrier 10 containing an aperture 307. This allows the end barrier 110 to contact the "L" shape offset plate surface 308, and hold the end barriers vertical. The end barrier 110 has the same downward force keeping it vertical as previously described in the flat plate hinge 77 described in other embodiments. The operation of the end barriers 70, 110 are similar in each of these embodiments. To summarize the mechanical difference between the offset hinge 300 and the flat plate hinge 76, the "L" shaped portion of the offset hinge 300 rotates, and embodies a right and left hinge component for each corner, whereas the "L" shape portion of the flat plate hinge 76 is fixed, does not rotate, and has no restriction as to orientation, and thus, applies universally to any corner.

The trailer 30 also can be broken down for shipping into multiple components. This is accomplished by utilizing any variety of fasteners with the trailer sections 32, 34, 36 as well as the end and side barriers 90, 92, 70, 110. Additionally, the tongue 156 and tongue slide 158 and the wheel axle assembly 175 may be separated.

Figure 32:
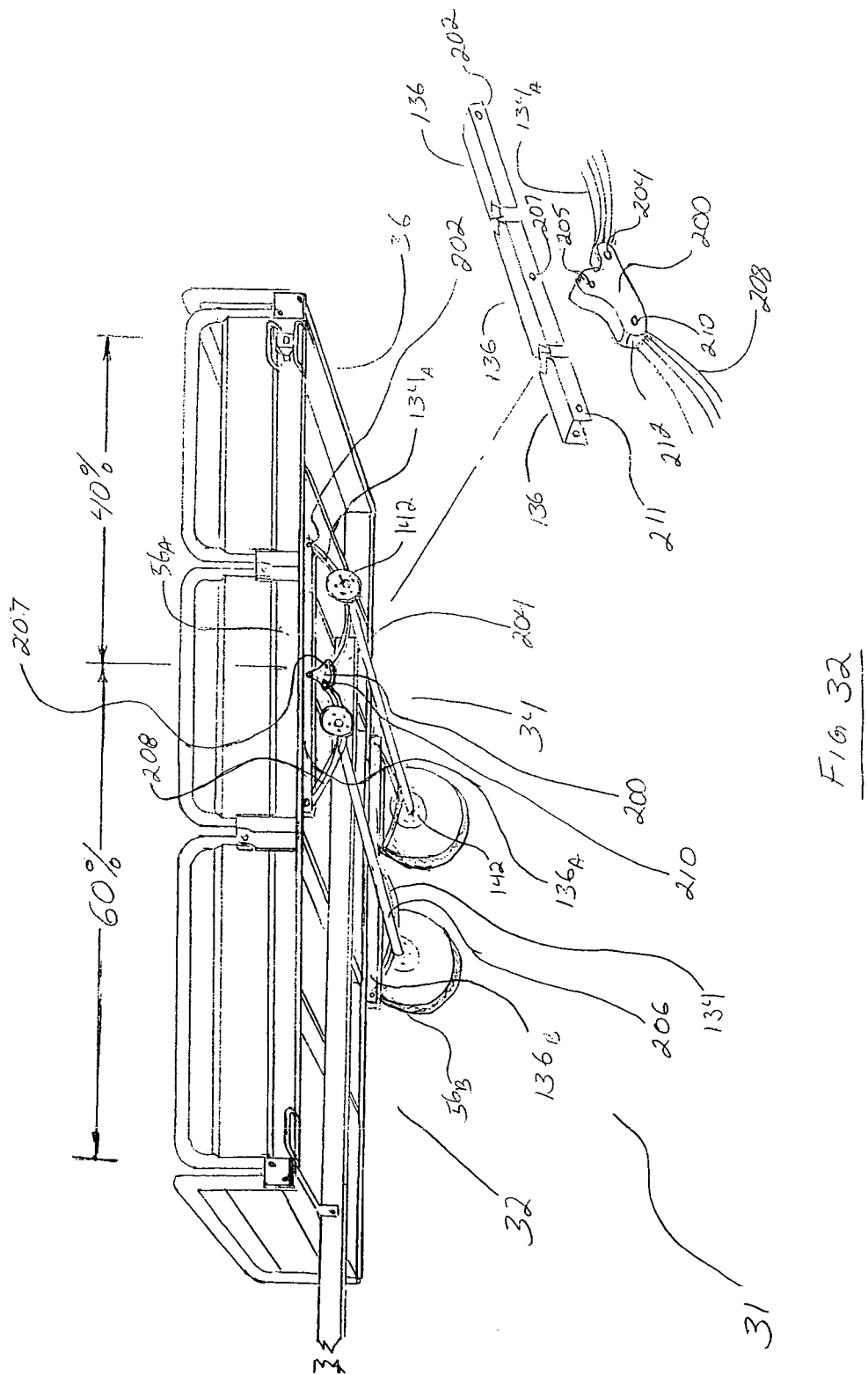
FIG. 32 illustrates an embodiment of a double axle embodiment of a folding vehicular utility trailer.

In addition to the single axle design utilizing the wheel axle assembly 175 disclosed in the above described embodiments, a second axle 206 may be added to the above trailer embodiments to realize a double axle vehicular trailer. As shown in FIG. 32, a second axle assembly is placed forward of the wheel axle assembly 175. The first axle 138 is placed in a similar manner to the embodiment disclosed in FIGS. 17 and 18, placing it on the center trailer section 34. The first and second axle suspension intermingles to forms a dual axle utilizing in this embodiment a three-point rocker 200 and additional set of front leaf spring 208 attached to the second axle 206. Other types of axles may be utilized in addition to the spring and rocker mechanism disclosed, and fall within the spirit of the disclosure, such as a torsional suspension, straight axle or the like.

A typical trailer suspension distributes trailer load in roughly a 60/40 weight distribution split to maintain a downward tongue weight. This design keeps a trailer from swaying back and forth while being towed (this is known as hunting). In order to keep this 60/40 split, the center trailer section 34 or the front trailer section 32 can be increased in length or a combination of both. The rear trailer section 36 typically remains constant, and will not have any striking of components when folded, which is elevated by the side barrier hinges 108, 109. The operational and mechanical aspects of the dual axle design remain constant as detailed above.

The operations of the trailer 30 of the disclosed embodiments will now be described and associated with their benefit. The trailer 30 is designed to keep all parts interconnected to each other, both in the open, compact or stored positions in order to insure that no parts are separated or left unattached unintentionally, potentially causing a hazardous situation. The trailer 30, in the complete open position, would be ready for towing simply by attaching the coupling 166 (see FIG. 26) and locking it down over the ball hitch of the towing vehicle. While in the open/towing configuration, the front end barrier 70 and the rear end barrier 110 may be either in the up and fixed position (i.e., FIG. 1) or placed flat (i.e., FIG. 20) to increase towing capacity. This is accomplished by releasing the front and rear end barriers 70 and 110 respectively, by disengaging the left and right single-finger spring pin latches 114, from the front and rear of the trailer by pulling back and rotating the fingers of the spring pin latches onto the finger parking tabs 118 and releasing (see FIGS. 6-9). This disengages the fingers from the universal locking tabs. The front end barriers 70, 110 may be then be laid down to rest on the tongue 156. The rear gate 110 may be lowered and fixed utilizing the attached end barrier cables 120 that were detailed in FIG. 10. Lowering the end barriers gives the user the option of extending the bed length and carrying capacity for longer payload.

To place the trailer 30 into a compact state, the user will access the handle of the side barrier spring latch 100 (see FIGS. 2 and 11) located on the side barrier hinge 108 and release the passenger side barriers 90. The user will lay the interlock side barriers downward simultaneously toward the inside of the trailer onto the bed floor 22, 24, 26 of the front, center and rear trailer sections 32, 34, 36 (see FIG. 21). The user will now repeat this process laying down the side barriers 92 on the opposing side. The side barriers 92 are able to be laid down simultaneously due to the exterior adjoining side barrier tabs/straps 96a, 96b shown in FIGS. 4 and 21. When being placed back into the upright position, the interior side barrier adjoining tab/straps 98a, 98b make it possible for side barriers to be raised simultaneously with one action and not individually. Laying down all side barriers may automatically disengage the single-finger spring pin latch 114 of the right side and left side of all side barriers 90, 92 and end barrier 70, 110 in the adjoining intersecting corners. At this point, the front end barrier 70 and rear end barrier 110 are ready to be folded inward.

The front end barrier 70 is then pulled down until the single-finger spring pin latch 114 engages into the aperture of the end barrier folded lock tab 130a, 130b on the front trailer section 32. The rear end barrier 110 is similarly pulled down to the inside of the trailer and there is very little clearance between components. The single-fingered spring pin latch 114 may also automatically engage into end barrier folded lock tab 130a, 130b on the rear trailer section 36 by the weight of the rear end barrier 110 when the end barriers 70, 110 are folded up and over the top of the previously folded and stored side barriers 90, 92. This retention mechanism is only need to keep the end barriers 70 and 110 and side barriers 90a, 90c, 92a, 92c secure, as the front and rear trailer sections 32, 36 are folded one on top of one another (see FIGS. 25 and 26).

Figure 25:
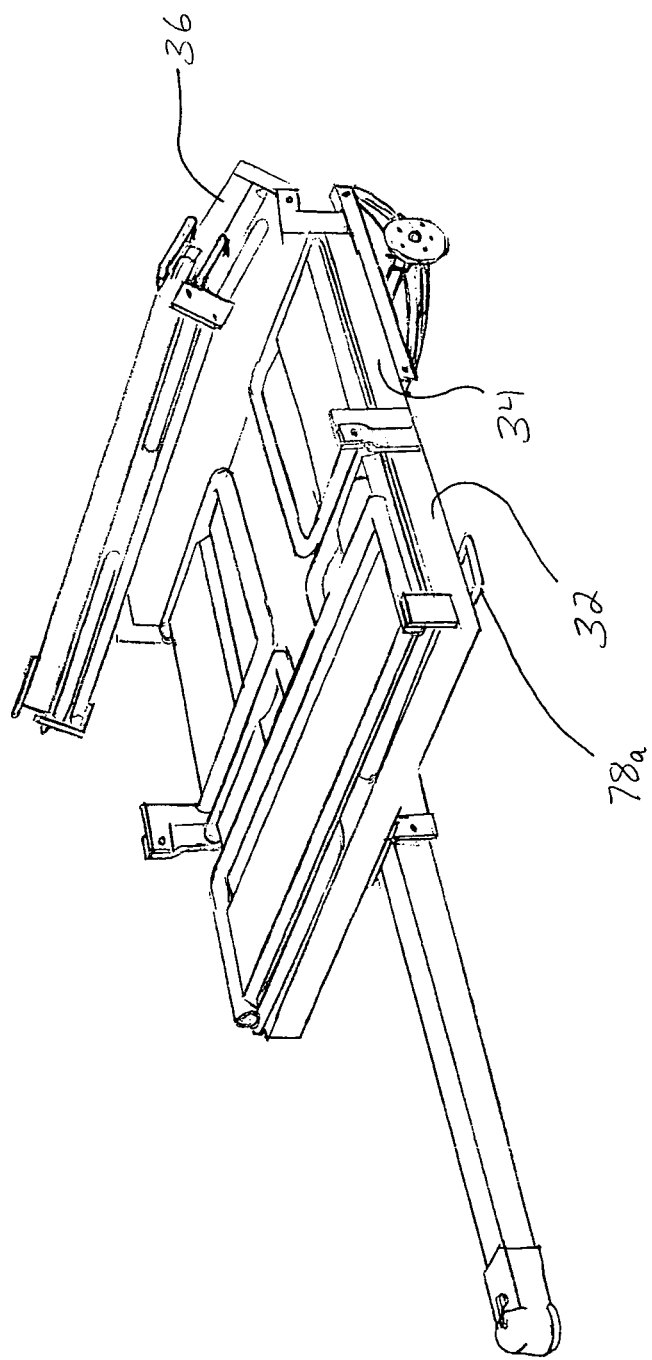
FIG. 25 illustrates an isometric view of an embodiment of a folding vehicular utility trailer with the rear trailer section partially folded.

Now that the side barriers 90, 92 and end barriers 70, 110 are in a folded position as seen in FIG. 24, the user can fold the front and rear trailer section 36, 32 to complete the compact state of the trailer 30. The user may then access the taillight guard and grab handle 128 on the rear corner of the rear trailer section 36. By lifting the rear trailer section 36 and its collected components (side barriers 90c, 92c and end barriers 110) utilizing the rear taillight guard grab handle 128, a rotation of the rear trailer section 36 (as seen in FIG. 25) on the rear side barrier hinges 103 will bring the rear trailer section 36 up and over 180-degrees to rest parallel and on top of the center trailer section 34. In this state, all components are laying parallel to one another with very small clearance. The rear side barrier hinge 103 is used to rotate the rear trailer section 36 and its components onto the end of this moment arm 103b and the center trailer section 34 has an offset aperture point of rotation 105 that is above and over the rear trailer section 36, but behind the part line 107.

The rear trailer section 36 is extended behind, and is attached below, the offset aperture point of rotational 105 of the rear translational side barrier hinge 109. This causes the offset vertical 103a to act as a lever arm. At the end of this moment of the rear side barrier hinge 109, is the attached rear trailer section 36. While this moment arm allows the rear trailer section 36 and its components to be folded up and over the center trailer section 34 and its components, it serves a dual purpose in that when in the open position (see FIG. 26), the weight of rear trailer section 36 and its components create a downward force normal to the moment arm, which keeps an applied force to the to the part line 107, which works to stabilize the position of the section. This gravitational force helps keep the trailer in the open position without additional securing means.

When rotating the rear trailer section 36, and its components, the part line 107 makes a full rotation to the rested position on top of the center trailer section 34, and its components. The part line surface 107r is a distance behind the original joined part line 107 of the rear side barrier hinge 109 in the open trailer position part line. Therefore, the rear trailer section 36 has translated backwards when in the folded position, thereby preventing the front bed section 32 and its components from striking when rotating upward on top in the compact/stored position as detailed above. Therefore, no locking is required of the folded rear trailer section 36 as is the case for the unfolded front and rear trailer sections 32, 34 because of the moment arms created by the offset vertical 102b, 103b, and gravity working on the front and rear trailer sections 34, 36.

Removing the locking tongue spring pin 131 from its aperture, shown in FIGS. 5 and 26 releases the front trailer section 32 from the elongated tongue 156. Now trailer 30 is prepared for the folding process to configure the trailer 30 to a compact configuration. By accessing either front grab handle 78a, 78b and lifting the front trailer section 32 and rotating it about the front transitional side barrier hinge 108, the front trailer section 32 is placed over and onto the previously folded rear trailer section 36 and its attached components. The front side barrier hinge 108 works in the same manner as the rear side barrier hinge 109 that extends higher above the front trailer section 32 and the center trailer section 34 to allow the front trailer section 32 and its collection of components of end barrier 70 and side barrier 90a, 90b to stack vertically and layered on top of the previously folded rear trailer section 36 and its components. Again, no locking is necessary at this stage as well, because of the importance of the sequence of folding and weight of the sections 32, 36 being folded utilizing gravitational force as a stabilizing mechanism.

Thus, to place the trailer 30 in the compact configuration, the side barriers 90, 92 are folded down into a flat position; the end barriers 70, 110 are then folded down into a flat position; the rear trailer section 36 and its folded components are then rotated and positioned upon the center trailer section 34; and, the front trailer section 32 and its components are now rotated and positioned upon the rear trailer section 36 that is stacked upon the center trailer section 34. In this compact configuration, the trailer 30 mat still be towed by a vehicle for transport of the trailer for one location to another (see FIG. 26).

Figure 19:
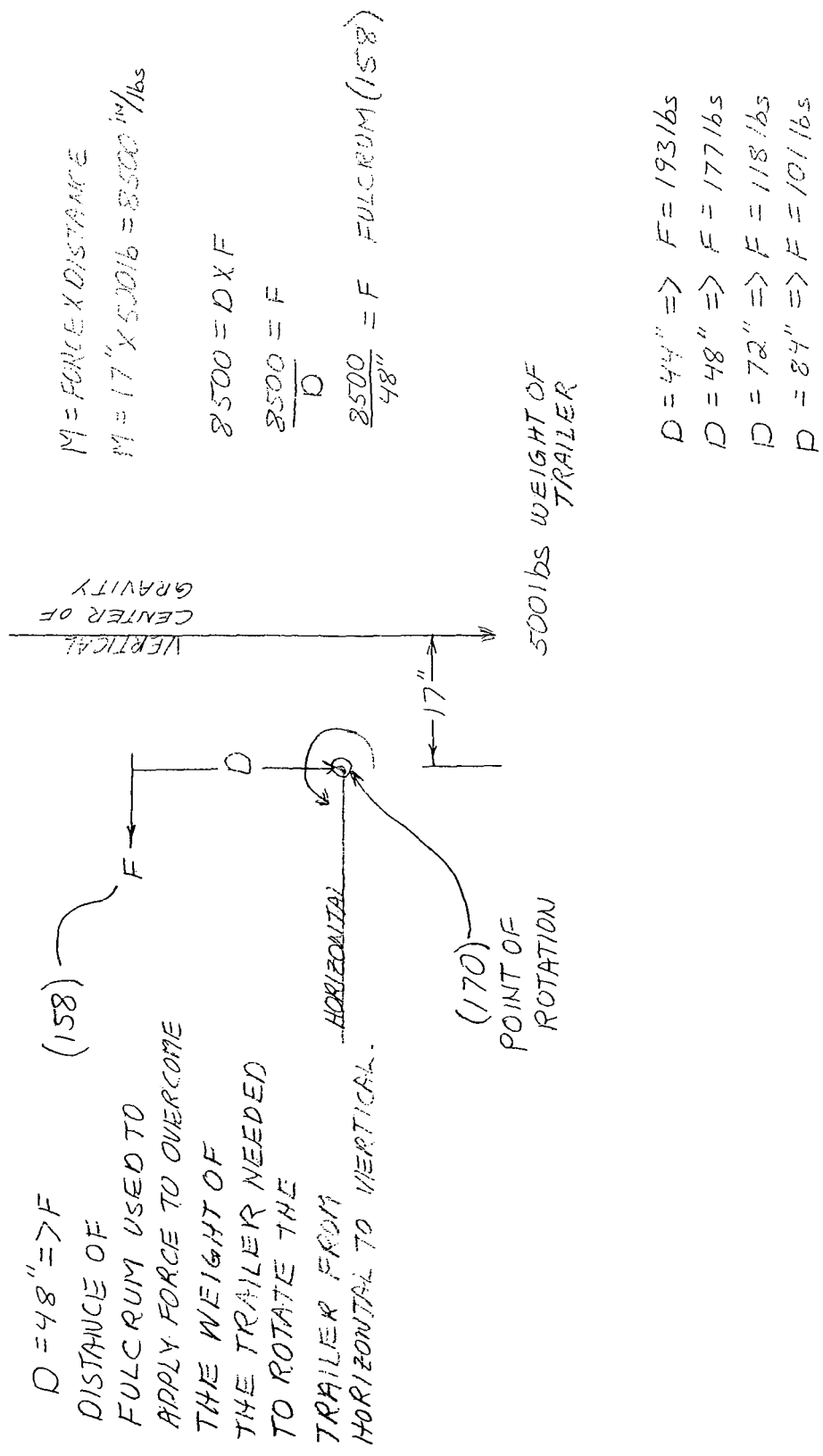
FIG. 19 illustrates the quantitative analysis equations for the stability of a folding vehicular utility trailer.

FIG. 27 illustrates an embodiment of a folding vehicular utility trailer with the trailer sections in a stored configuration. To place the trailer 30 into this stored configuration, the trailer 30 is rotated from its towed position to a vertical position as displayed in FIG. 27. This is accomplished by removing the trailer 30 from any towing vehicles and lifting on the tongue 156, which serves as a fulcrum lever for rotating upward. As the user begins to lift up on the elongated tongue 156 and/or tongue slide 155, the folded trailer will rotate onto the caster stops 170 and the trailer tires, thereby holding the trailer in a balanced position at approximately 45-degrees to the ground. At this point, the trailer is resting in a transitional, stable position. Continued rotation of the trailer over the caster stops 170 will also place the trailer 30 additionally onto the front casters 172a. The trailer is now in a stable, but still remains mobile with the center of gravity being relatively low in both in a horizontal and vertical orientation. As the rotation into the vertical position starts to occur, the low center of gravity helps the user rotate it up onto the casters stops 170 and the front and rear casters 171, 172. As the rotation of the tongue 156 continues, the center of gravity progressively shifts rearward and downward, allowing it to easily be rotated onto the casters 171, 172. Once the trailer is fully supported by the casters 171, 172, this low center of gravity, along with the broad stance of the casters and their ability to roll freely, creates high inertia, making it very stable in the vertical stored position. This stability can be quantified utilizing the quantitative analysis found in FIG. 19. The computations for the stability in FIG. 19 demonstrate the coupling effect of the low friction of the rolling casters 172 with the high force required to rotate (see FIGS. 19 and 25). This analysis demonstrates the high stability of the trailer 30 in the vertical stowed configuration.

The tongue 156 and tongue slide 158 may be rotated from its current twelve o'clock (vertical) position by ninety-degrees to a three o'clock or nine o'clock stowed position (see FIGS. 28 and 29). This then removes the fulcrum lever, which adds to the stability and collection of the stowed trailer. To rotate the tongue and tongue slide 155 back to the vertical position, it is rotated and locked into the saddles 154 and 162, which then may engage 164 into the rear tongue slide locking tab 160. The trailer 30 may easily be placed back in the horizontal position by reversing the aforementioned steps.

The advantage of the previously mentioned operations is that the trailer components stay attached to the trailer and the components interlock. The trailer does not require side barriers or other components to be removed or stay fixed. Not only does it make for more efficient storage, but it improves the safety aspects by reducing the risk of components becoming detached or not being secured properly.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

The embodiments of the invention in which an exclusive property or privilege is claimed are defined as follows:

1. A utility trailer configured to be towed behind a vehicle that facilitates alteration between an open configuration and a compact configuration comprising:
    a center trailer section comprising:
        a rigid rectangular center frame chassis;
        a center bed floor disposed on said center frame;
        a wheeled axle and suspension system supporting said center frame; and,
        a pair of collapsible center side barriers pivotally attached to opposing lateral sides of said center frame such that said center side barriers may maintain a normal orientation to said center bed floor in an open configuration, and fold approximately parallel to, and stacked upon, said center bed floor in a compact configuration;
    a front trailer section comprising:
        a rigid rectangular front frame chassis;
        a front bed floor disposed on said front frame;
        a pair of collapsible front side barriers pivotally attached to opposing lateral sides of said front frame such that said front side barriers may maintain a normal orientation to said front bed floor in an open configuration, and fold approximately parallel to, and stacked upon, said front bed floor in a compact configuration; and,
        a collapsible front end barrier pivotally attached to the front portion of said front frame such that said front end barrier may maintain a normal orientation, or a parallel orientation extending forward of said front bed floor in an open configuration, and fold approximately parallel to, and stacked upon, said front side barriers in a compact configuration;

a rear trailer section comprising:
a rigid rectangular rear frame chassis;
a rear bed floor disposed on said rear frame;
a pair of collapsible rear side barriers pivotally attached to opposing lateral sides of said rear frame such that said rear side barriers may maintain a normal orientation to said rear bed floor in an open configuration, and fold approximately parallel to, and stacked upon, said rear bed floor in a compact configuration; and,
a collapsible rear end barrier pivotally attached to the rear portion of said rear frame such that said rear end barrier may maintain a normal orientation, or a parallel orientation extending rearward of said rear bed floor in an open configuration, and fold approximately parallel to, and stacked upon, said rear side barriers in a compact configuration;

a tongue that facilitates connection between said center trailer section and said vehicle;

a rearward offset hinge mechanism comprising two offset braces joined by a rear pivot, that pivotally joins said center trailer section and said rear trailer section such that the pivot point of said junction is offset above said center bed floor by a distance of half the combined thickness of said collapsed center side barrier, said collapsed rear side barrier, said rear end barrier, combined with said rear pivot diameter, thereby allowing said rear trailer section to stack directly upon said collapsed center trailer section thereby minimizing the overall stack height of said center and said rear trailer sections; and, a forward offset hinge mechanism comprising two forward offset braces joined by a forward pivot, that pivotally joins said center trailer section and said front trailer section such that the pivot point of said junction is offset above said center bed floor by a distance of half the combined thickness of said collapsed center side barrier, said collapsed rear side barrier, said rear end barrier and said rear trailer section, said collapsed forward side barrier, said front end barrier, combined with said forward and rear pivot diameter, thereby allowing said front trailer section to stack directly upon said collapsed rear trailer section when it is stacked directly upon said center trailer section thereby minimizing the overall stack height of said center, said rear and said front trailer sections.

2. A utility trailer configured to be towed behind a vehicle that facilitates alteration between an open configuration, a compact configuration and a stored configuration comprising:

a center trailer section comprising:
a rigid rectangular center frame chassis;
a center bed floor disposed on said center frame;
a wheeled axle and suspension system supporting said center frame; and,
a pair of collapsible center side barriers pivotally attached to opposing lateral sides of said center frame such that said center side barriers may maintain a normal orientation to said center bed floor in an open configuration, and fold approximately parallel to, and stacked upon, said center bed floor in a compact configuration or stored configuration;

a front trailer section comprising:
a rigid rectangular front frame chassis;
a front bed floor disposed on said front frame;
a pair of collapsible front side barriers pivotally attached to opposing lateral sides of said front frame such that said front side barriers may maintain a normal orientation to said front bed floor in an open configuration, and fold approximately parallel to, and stacked upon, said front bed floor in a compact configuration or stored configuration; and,
a collapsible front end barrier pivotally attached to the front portion of said front frame such that said front end barrier may maintain a normal orientation, or a parallel orientation extending forward of said front bed floor in an open configuration, and fold approximately parallel to, and stacked upon, said front side barriers in a compact configuration or stored configuration;

a rear trailer section comprising:
a rigid rectangular rear frame chassis;
a rear bed floor disposed on said rear frame;
a pair of collapsible rear side barriers pivotally attached to opposing lateral sides of said rear frame such that said rear side barriers may maintain a normal orientation to said rear bed floor in an open configuration, and fold approximately parallel to, and stacked upon, said rear bed floor in a compact configuration or stored configuration; and,
a collapsible rear end barrier pivotally attached to the rear portion of said rear frame such that said rear end barrier may maintain a normal orientation or a parallel orientation extending rearward of said rear bed floor in an open configuration, and fold approximately parallel to, and stacked upon, said rear side barriers in a compact configuration or stored configuration;

a tongue that facilitates connection between said center trailer section and said vehicle, said tongue that remains fixed upon the centerline of said center trailer section in said open configuration, and said tongue that rotates in the plane of said center trailer bed to a normal position to said centerline of said center trailer section in said stored configuration;

a rearward offset hinge mechanism comprising two offset braces joined by a rear pivot, that pivotally joins said center trailer section and said rear trailer section such that the pivot point of said junction is offset above said center bed floor by a distance of half the combined thickness of said collapsed center side barrier, said collapsed rear side barrier, said rear end barrier, combined with said rear pivot diameter, thereby allowing said rear trailer section to stack directly upon said collapsed center trailer section thereby minimizing the overall stack height of said center and said rear trailer sections;

a forward offset hinge mechanism comprising two forward offset braces joined by a forward pivot, that pivotally joins said center trailer section and said front trailer section such that the pivot point of said junction is offset above said center bed floor by a distance of half the combined thickness of said collapsed center side barrier, said collapsed rear side barrier, said rear end barrier and said rear trailer section, said collapsed forward side barrier, said front end barrier, combined with said forward and rear pivot diameter, thereby allowing said front trailer section to stack directly upon said collapsed rear trailer section when it is stacked directly upon said center trailer section thereby minimizing the overall stack height of said center, said rear and said front trailer sections;

at least two lower castors positioned on the underside of said center trailer section oriented in a rearward direction; and, at least two upper castors positioned on the underside of said rear trailer section oriented in a forward direction in said open configuration and oriented in a rearward direction in a compact configuration that allow said trailer to be rotated approximately 90 degrees along a centerline from front to back in a compact configuration, to support the weight of said trailer in with said upper castors and said lower castors by raising said tongue from a horizontal orientation to a vertical orientation.

3. The utility trailer of claim 1, wherein said tongue additionally pivots laterally in the plane of the center bed floor to contribute to said compact configuration or collapsed stowed position for storage.

4. The utility trailer of claim 1, wherein said tongue pivotally engages and disengages saddles when pivotally moving in and out of said collapsed stowed position; and wherein said saddles restricts torsion, vertical and horizontal movement of said tongue.

5. The utility trailer of claim 4, wherein said saddles that engage said tongue and further restricts said torsion, vertical and horizontal movement, and pivotal movement of said tongue.

6. The utility trailer of claim 1, wherein said center side barriers of said center trailer sections engage and disengage from said front and rear section side barriers to allow alteration of said open configuration to said compact configuration.

7. The utility trailer of claim 1, further comprising a second wheeled axel and suspension system supporting said center frame.

8. The utility trailer of claim 1, wherein said trailer can be towed in said open configuration and said compact configuration.

9. The utility trailer of claim 1, wherein said front side barriers, said center side barriers and said rear side barriers have an interior side barrier adjoining tab and an exterior side barrier adjoining tab which interlock with adjacent said side barriers, thereby allowing adjacent said side barriers to engage and disengage when transforming from said compact configuration to said open configuration, and from said open configuration to said compact configuration.

10. The utility trailer of claim 1, wherein said front side barriers, said center side barriers and said rear side barriers have an interior side barrier adjoining tab and an exterior side barrier adjoining tab which interlock with adjacent said side barriers, thereby allowing all adjacent said side barriers to be raised and lowered as a single unit to said open configuration.

11. The utility trailer of claim 2, wherein said tongue additionally pivots laterally in the plane of the center bed floor to contribute to said compact configuration or collapsed stowed position for storage.

12. The utility trailer of claim 2, wherein said tongue pivotally engages and disengages saddles when pivotally moving in and out of said collapsed stowed position; and wherein said saddles restricts torsion, vertical and horizontal movement of said tongue.

13. The utility trailer of claim 12, wherein said saddles that engage said tongue and further restricts said torsion, vertical and horizontal movement, and pivotal movement of said tongue.

14. The utility trailer of claim 2, wherein said center side barriers of said center trailer sections engage and disengage from said front and rear section side barriers to allow alteration of said open configuration to said compact configuration.

15. The utility trailer of claim 2, further comprising a second wheeled axel and suspension system supporting said center frame.

16. The utility trailer of claim 2, which facilitates said towing behind a vehicle in said open configuration and said compact configuration.

17. The utility trailer of claim 2, wherein said front side barriers, said center side barriers and said rear side barriers have an interior side barrier adjoining tab and an exterior side barrier adjoining tab which interlock with adjacent said side barriers, thereby allowing adjacent said side barriers to engage and disengage when transforming from said compact configuration to said open configuration, and from said open configuration to said compact configuration.

18. The utility trailer of claim 2, wherein said front side barriers, said center side barriers and said rear side barriers have an interior side barrier adjoining tab and an exterior side barrier adjoining tab which interlock with adjacent said side barriers, thereby allowing all adjacent said side barriers to be raised and lowered as a single unit to said open configuration.

* * * * *